United States Patent
Matsuda

(10) Patent No.: US 11,403,612 B2
(45) Date of Patent: *Aug. 2, 2022

(54) SYSTEM, METHOD, OPERATOR SERVER, AND PROGRAM FOR FINANCIAL DEMAND RESPONSE PROVISION SERVICES

(71) Applicant: FTS KABUSHIKI KAISHA, Tokyo (JP)

(72) Inventor: Yutaro Matsuda, Tokyo (JP)

(73) Assignee: FTS KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,792

(22) Filed: Apr. 16, 2021

(65) Prior Publication Data

US 2021/0272094 A1 Sep. 2, 2021

Related U.S. Application Data

(62) Division of application No. 16/474,500, filed as application No. PCT/JP2017/035041 on Sep. 27, 2017, now Pat. No. 11,010,746.

(30) Foreign Application Priority Data

Dec. 28, 2016 (JP) .............................. JP2016-254858

(51) Int. Cl.
   *G06Q 20/28* (2012.01)
   *G06Q 20/10* (2012.01)
   *G06Q 30/04* (2012.01)

(52) U.S. Cl.
   CPC ............. *G06Q 20/28* (2013.01); *G06Q 20/10* (2013.01); *G06Q 30/04* (2013.01)

(58) Field of Classification Search
   CPC ........ G06Q 20/28; G06Q 20/10; G06Q 30/04; G06Q 40/00; G06Q 40/02
   (Continued)

(56) References Cited

U.S. PATENT DOCUMENTS

| 6,363,488 B1 * | 3/2002 | Ginter | G06F 21/6209 |
| | | | 375/E7.009 |
| 7,165,041 B1 * | 1/2007 | Guheen | G06Q 30/0601 |
| | | | 705/26.1 |

(Continued)

FOREIGN PATENT DOCUMENTS

| CN | 101110149 A | 1/2008 |
| CN | 105701737 A | 6/2016 |

(Continued)

OTHER PUBLICATIONS

Communication dated Apr. 7, 2020, from the State Intellectual Property Office of People's Republic of China in counterpart Application No. 201780081291.3.

(Continued)

*Primary Examiner* — Garcia Ade
(74) *Attorney, Agent, or Firm* — ArentFox Schiff LLP

(57) ABSTRACT

A financial demand response provision service system having a company server that manages the credit limit for employees, a time server managing employee time data, a provider server that manages the employees' managed accounts, and a bank server that manages the employees' bank accounts to which salary is transferred which are connected via a network wherein the provider server has a calculation unit for transferring electronic value information of an advance in which the advanceable amount is calculated based on the credit limit for an employee and the time data, an auto charge data output unit which transfers electronic value information of the advance to the bank account, and an output means that outputs, to the company server, the (Continued)

advance amount loaned to the employee by transferring the electronic value information, wherein the total advanced amount to the employees of a same company does not exceed the company's total advanceable amount.

4 Claims, 32 Drawing Sheets

(58) Field of Classification Search
USPC .......................................................... 705/34
See application file for complete search history.

(56) References Cited

U.S. PATENT DOCUMENTS

| | | | | |
|---|---|---|---|---|
| 8,429,068 | B1* | 4/2013 | Fasoli | G06Q 30/06 |
| | | | | 705/36 R |
| 8,639,625 | B1* | 1/2014 | Ginter | H04L 63/101 |
| | | | | 705/50 |
| 2001/0034676 | A1 | 10/2001 | Vasic | |
| 2012/0054088 | A1 | 3/2012 | Edrington et al. | |
| 2016/0026981 | A1 | 1/2016 | Collins et al. | |
| 2019/0108522 | A1* | 4/2019 | Yui | G06Q 20/108 |

FOREIGN PATENT DOCUMENTS

| | | |
|---|---|---|
| JP | 2004-265369 A | 9/2004 |
| JP | 2006-4263 A | 1/2006 |
| JP | 2014-89698 A | 5/2014 |
| WO | WO 01/59663 A1 | 8/2001 |
| WO | WO 2004/057509 A1 | 8/2004 |
| WO | WO 2009/076705 A1 | 6/2009 |

OTHER PUBLICATIONS

Communication dated May 12, 2020, from the European Patent Office in counterpart European Application No. 17887448.3.
Decision to Grant a Patent dated Oct. 17, 2017, from the Japanese Patent Office in counterpart application No. 2016-254858.
International Search Report, issued by International Searching Authority in corresponding International Application No. PCT/JP2017/035041, dated Oct. 24, 2017.
Office Action dated Dec. 4, 2019, issued by the Malaysian Patent Office in counterpart Malaysian Application No. PI2019003696.
The Tokyo Tomin Bank, Ltd., "Pre-paid", [Online], The Tokyo Tomin Bank, Ltd., [Nov. 11, 2016 search], Internet <URL:http://www.tominbank.co.jp/for_hojin/maekyu/.

* cited by examiner

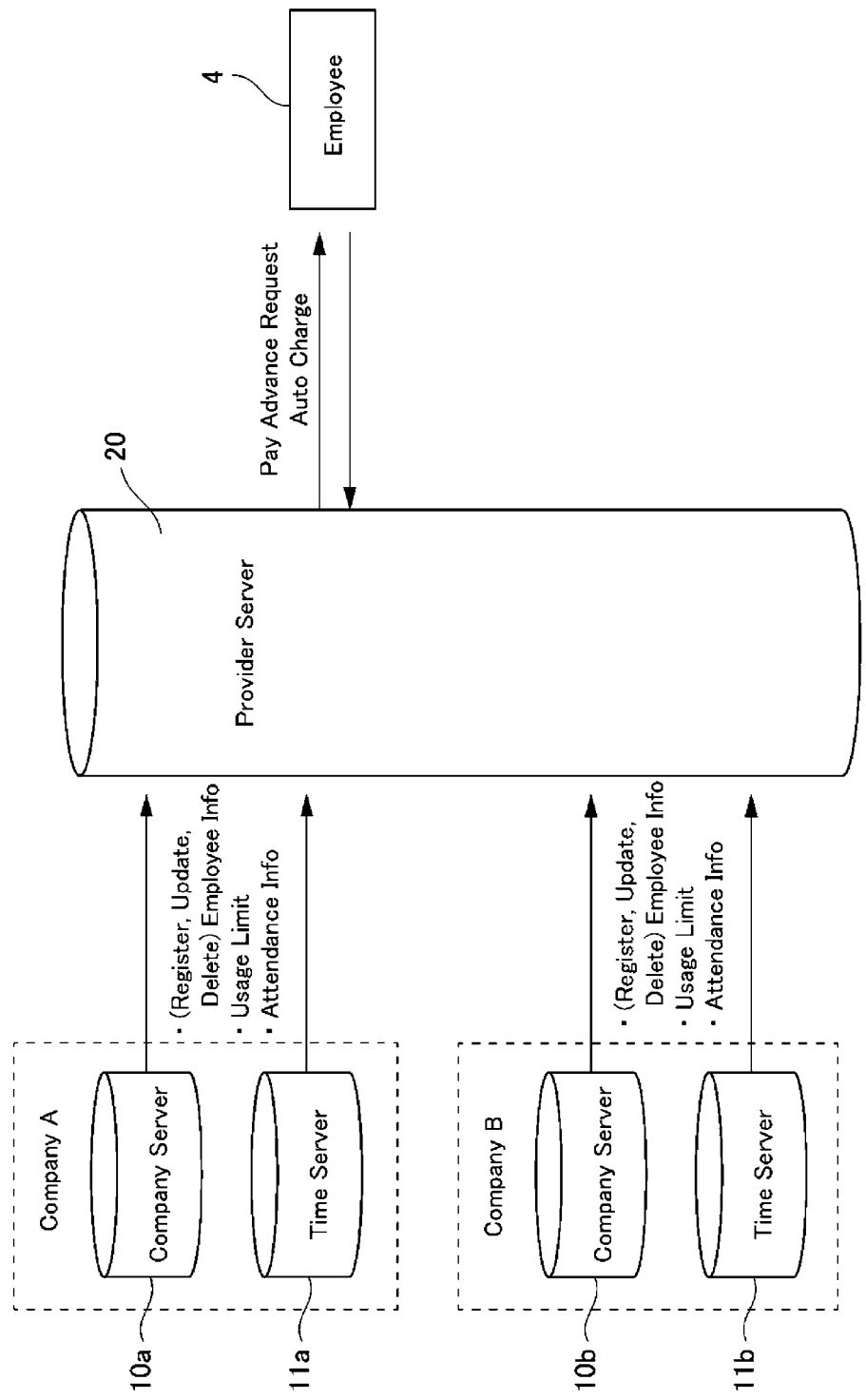

FIG.22

Pay Advance System
Company Management Screen

| Company Name | Monthly Usage/Balance | No. of Consecutive Months | No. of Employees | Grade | Agency | Person in Charge | Remarks |
|---|---|---|---|---|---|---|---|
| ○○Company | 3,000,000 JPY / 10,000,000 JPY | 3 Months | 100 | Gold | △△ | ☐☐ | None |
| ○○Trust Group | 1,000,000 JPY / 5,000,000 JPY | 1 Month | 200 | Gold | △△ | ☐☐ | None |
| Co. Ltd.○○ | 300,000 JPY / 1,000,000 JPY | 1 Month | 50 | Gold | △△ | ☐☐ | None |
| LLC○○ | 3,000,000 JPY / 10,000,000 JPY | 4 Months | 100 | Blue | △△ | ☐☐ | None |
| ○○Beverage | 6,000,000 JPY / 30,000,000 JPY | 3 Months | 300 | Gold | △△ | ☐☐ | None |
| | 3,000,000 JPY / 20,000,000 JPY | 2 Months | 150 | Gold | | | |
| a | b | c | d | e | | | |

FIG. 27A

Employee Data 231

| Company ID |
| Employee ID |
| Card ID |
| ... |

FIG. 27B

Salary Table 232

| Company ID |
| Employee ID |
| Hourly/Daily/ Monthly |
| Salary Amount |

FIG. 27C

Charge Data 233

| Card ID |
| Auto/Manual |
| Charge Account |

FIG. 27D

Time Data 234

| Company ID |
| Employee ID |
| Work Day(s)/Month |
| Work Hour(s) |

US 11,403,612 B2

SYSTEM, METHOD, OPERATOR SERVER, AND PROGRAM FOR FINANCIAL DEMAND RESPONSE PROVISION SERVICES

CROSS-REFERENCE TO RELATED APPLICATIONS

This application is a Divisional of U.S. patent application Ser. No. 16/474,500, filed on Jun. 27, 2019, which is a national stage entry of International Application No. PCT/JP2017/035041, filed on Sep. 27, 2017, which claims priority from Japanese Patent Application No. 2016-254858, filed on Dec. 28, 2016, the disclosures of which are incorporated herein by reference in their respective entireties.

TECHNICAL FIELD

The present invention relates to a system, method, operator server, and program for providing financial demand response provision services for employees belonging to a company.

BACKGROUND ART

Using a prepaid system to withdraw a fixed amount for employees working before payday is known. By using a prepaid system, the turnover rate of employees who are hired by and work for a company is able to be reduced, and additionally, because employees can also use the fixed amount for things such as sudden expenses, the availability of employees such as part-time workers is particularly increased.

For the "prepaid system" provided by the Tokyo Tomin Bank Limited as a part of banking services (see Non-Patent Document 1), if a company has introduced the "prepaid system", employees belonging to the company are able to easily apply for the "prepaid system" from a mobile phone, smart phone, PC or the like. Then, if the "prepaid system" is used, the very next day, the funds will be transferred to a bank account to receive the employee's salary, on the other hand, the remaining salary amount after deducting the "prepaid system" use is transferred to the bank account.

For example, Patent Document 1 describes a payroll prepaid service for realizing the above-mentioned "prepaid system" by a bank computer. According to the technique described in Patent Document 1, the bank computer has a processing device, a storage device, and a data input interface. Then, based on the necessary data transmitted from the employee (workers) via the data input interface, the processing device refers to the file stored in the storage device (work data management file, payroll data management file, fund data management file), and performs a processing to transfer a payable salary amount based on the employee's work performance to the employee's payroll account. This makes making a payment of an amount not exceeding the payable salary amount based on work performance possible at any time desired by the employee. That is, the salary can be prepaid to the employee in a form desired by the employee.

PRIOR ART DOCUMENTS

Patent Documents

[Patent Document 1] Japanese Unexamined Patent Application 2004-265369

Non-Patent Documents

[Non-Patent Document 1] The Tokyo Tomin Bank, Ltd., "Pre-paid", [Online], The Tokyo Tomin Bank, Ltd., [Nov. 11, 2016 search], Internet <URL: http://www.tomin-bank.co.jp/for_hojin/maekyu/>

DISCLOSURE OF INVENTION

Summary of the Invention

However, according to the payroll prepayment service realized by the bank computer, the company incurs costs for installation and operation, and the company has to prepare a deposit. In addition, a certain amount of time is needed for employees to apply for a prepaid salary and then transfer the funds to a bank account. For this reason, in order to realize the service to meet the financial needs of employees before payday like with payroll prepayment services, the emergence of a financial demand response provision service that can be used in real time by employees without relying solely on bank transfers is desired.

The present invention has been made to solve the above-mentioned problems, and in order to realize the service to meet the financial needs of employees before payday, an object of the present invention is to provide a system, a method, an operator server, and a program for a financial demand response provision service which can be used in real time without relying solely on bank transfers on the employee side.

The present invention is grasped by the following composition in order to achieve the above-mentioned object.

(1) A financial demand response provision service system for providing financial demand response services to employees belonging to a company comprising: a company server for managing a credit limit for each employee, an attendance management data server for managing attendance management data of the employees, a provider server for managing managed accounts of the employees, and a bank server for managing a bank account to which the salary of an employee is transferred from the company, wherein the servers are connected via a network, and wherein the provider server comprises: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs a transfer processing of transferring electronic value information of the advance of a managed account to a bank account, and an output means which outputs to the company server, the advance amount loaned to the employee by transferring the electronic value information of the advance from a managed account to a bank account, wherein the total advanceable amount to the employees of a same company does not exceed the company's total advanceable amount range for the company as set by the provider.

(2) The financial demand response provision service system according to above described configuration (1), wherein if a total advanceable amount to the employees within a predetermined period of the same company exceeds the company's total advanceable amount range, the auto charge data output unit cancels the transfer processing of electronic value information of advances to bank accounts from managed accounts of employees at the company in which the total advanceable amount for the employees exceeds the company's total advanceable amount range.

(3) The financial demand response provision service system according to one of the above described configurations (1) and (2), wherein the advanceable amount range for the company is set based on the company credit information with regards to a credit of the company, and the provider server includes a company credit manager unit that manages the company credit information.

(4) The financial demand response provision service system according to one of the above described configurations (1), (2) and (3), wherein the provider server includes a usage fee calculation unit that calculates the usage fee of the financial demand response service based on the electronic value information of the advance transferred by the auto charge data output unit, and a billing unit for billing the company or the employee for use of the financial demand response service.

(5) The financial demand response provision service system according to one of the above described configurations (1) through (4), wherein an employee terminal connected via a network and operated by an employee transmits selection information for automatically or manually transferring the electronic value information of the advance from the managed account to the bank account, wherein the provider server includes an attendance management data acquisition unit which receives attendance management data, wherein when the attendance management data acquisition unit receives new attendance management data, the calculation unit calculates a new advanceable amount for an employee, transfers electronic value information of the advance managed by a provider temporarily providing on behalf of the company based on the new advanceable amount, and increases the electronic value information of the advance managed by the managed account, and wherein if the selection information transmitted beforehand from the employee terminal instructs performance to be done automatically, when the electronic value information of the advance increases, the auto charge data output unit increases the electronic value information of the advance from the managed account to the bank account within the increased range of the electronic value information of the advance.

(6) The financial demand response provision service system according to above described configuration (5), wherein if the employee terminal transmits transmission information for automatically transferring the electronic value information of the advance from the managed account to the bank account, information as to whether to transfer a fixed amount or a fluctuating amount that fluctuates at a fluctuating rate set by the employee beforehand is also transferred to the bank account, wherein in the case where the information indicates that a fixed amount is to be made, if the fixed amount is lower than the increase in the electronic value information of the advance, the auto charge data output unit transfers the electronic value information of the advance corresponding to only the fixed amount to the bank account, but if the increased electronic value information of the advance is lower than the fixed amount, the auto charge data output unit transfers only the increased amount as the electronic value information of the advance to the bank account, and in the case where the information indicates that the transfer is to be done by a fluctuating amount that fluctuates at a fluctuating rate, the auto charge data output unit transfers to the bank account the electronic value information of the advance in the amount obtained by multiplying the increased electronic value information of the advance by the fluctuating rate.

(7) The financial demand response provision service system according to above described configuration (5) or (6), wherein the calculation unit calculates a new advanceable amount to the employee when the attendance management data acquisition unit receives attendance management data.

(8) The financial demand response provision service system according to one of the above described configurations (5) through (7), wherein if the selection information transmitted beforehand from the employee terminal has been selected to be performed manually, when transfer instruction information from the employee terminal is received for transferring a predetermined amount to the bank account, the auto charge data output unit transfers to the bank account electronic value information of the advance corresponding to the predetermined amount in the transfer instruction information based on electronic value information of the advance of the management account.

(9) The financial demand response provision service system according to one of the above described configurations (1) through (8), wherein the provider server resets the electronic value information of the advance remaining in the managed account as of the company's payroll closing date, an individual's closing date as determined by the company, or a common closing date for all companies and has a deduction data generation unit which generates an amount corresponding to the electronic value information of the advance transferred to the bank account by the auto charge data output unit as salary deduction data, and wherein the company server periodically or irregularly acquires the salary deduction data from the deduction data generation unit for the bank server, and from the salary calculated based on the employee's managed time, requests execution of transfer processing of the transfer amount minus the advance amount corresponding to the salary deduction data.

(10) The financial demand response provision service system according to one of the above described configurations (1) through (3), wherein when performing the transfer processing for transferring the electronic value information of the advance of the managed account to the bank account, the auto charge data output unit transfers to the bank account the electronic value information minus a transfer processing fee.

(11) A financial demand response provision service system according to another configuration for providing financial demand response services to employees belonging to a company comprising: a company server for managing the credit limit for each employee, an attendance management data server for managing attendance management data of the employees, a provider server that manages managed accounts of the employees, and a bank server for managing a bank account for employee card payments, wherein the servers are connected via a network, and wherein the provider server comprises: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs the transfer processing of transferring electronic value information of the advance of the managed account to the bank account, and an output means which outputs to the company server, the advance amount loaned to the employee by transferring the electronic value information of the advance from a managed account to a bank account, wherein the total advanceable amount to the employees of a same company does not exceed the company's total advanceable amount range for the company as set by the provider.

(12) A financial demand response provision service system according to another configuration for providing financial demand response services to employees belonging to a company comprising: a company server for managing the credit limit for each employee, an attendance management data server for managing attendance management data of the employees, a provider server that manages managed accounts of the employees, and an electronic money server for managing electronic money of the employee; wherein the servers are connected via a network, and wherein the provider server comprises: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which charges to the employee's electronic money electronic value information of the advance in the managed account, and an output means which outputs to the company server, the advance amount loaned to the employee by charging to a bank account the electronic value information of the advance from a managed account, wherein the total advanceable amount to the employees of a same company does not exceed the company's total advanceable amount range for the company as set by the provider.

(13) A financial demand response provision service system according to another configuration for providing financial demand response services to employees belonging to a company comprising: a company server for managing the credit limit for each employee, an attendance management data server for managing attendance management data of the employees, a provider server that manages managed accounts of the employees, and a virtual currency server for managing virtual currency accounts of the employees; wherein the servers are connected via a network, and wherein the provider server comprises: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs a transfer processing of transferring electronic value information of the advance of a managed account to a virtual currency account, and an output means which outputs to the company server, the advance amount loaned to the employee by transferring the electronic value information of the advance from a managed account to a virtual currency account, wherein the total advanceable amount to the employees of a same company does not exceed the company's total advanceable amount range for the company as set by the provider.

(14) The financial demand response provision service system according to any one of the above described configurations (1) through (13), wherein the provider server includes an advance raising unit for raising advances through crowdfunding which includes the ability to transmit information on the financial demand response service and information on the provision of advances to an unspecified number of people via a network.

(15) A provider server for a financial demand response provision service system according to another configuration for providing financial demand response services to employees belonging to a company having a company server for managing the credit limit for each employee, an attendance management data server for managing attendance management data of the employees, a provider server that manages managed accounts of the employees, and a bank server for managing a bank account to which the salary of the employee is transferred from the company wherein the servers are connected via a network, the provider server comprising: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs a transfer processing of transferring electronic value information of the advance of a managed account to a bank account, and an output means which outputs to the company server, the advance amount loaned to the employee by transferring the electronic value information of the advance from a managed account to a bank account, wherein the total advanceable amount to the employees of a same company does not exceed the company's total advanceable amount range for the company as set by the provider.

(16) A provider server for a financial demand response provision service system according to another configuration for providing financial demand response services to employees belonging to a company having a company server for managing the credit limit for each employee, an attendance management data server for managing attendance management data of the employees, a provider server that manages managed accounts of the employees, and a bank server for managing a bank account for the card payment of the employee wherein the servers are connected via a network, the provider server comprising: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs the transfer processing of transferring electronic value information of the advance of the managed account to the bank account, and an output means which outputs to the company server, the advance amount loaned to the employee by transferring the electronic value information of the advance from a managed account to a bank account, wherein the total advanceable amount to the employees of a same company does not exceed the company's total advanceable amount range for the company as set by the provider.

(17) A provider server for a financial demand response provision service system according to another configuration for providing financial demand response services to employees belonging to a company having a company server for managing the credit limit for each employee, an attendance management data server for managing attendance management data of the employees, a provider server that manages managed accounts of the employees, and an electronic money server for managing electronic money of the employee wherein the servers are connected via a network, the provider server comprising: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which charges to the employee's electronic money electronic value information of the advance in the managed account, and an output means which outputs to the company server, the advance amount loaned to the employee by charging to a bank account the electronic value information of the advance from a managed account, wherein the total advanceable amount to the employees of a same company does not exceed the company's total advanceable amount range for the company as set by the provider.

(18) A provider server for a financial demand response provision service system according to another configuration for providing financial demand response services to employees belonging to a company having a company server for managing the credit limit for each employee, an attendance management data server for managing attendance management data of the employees, a provider server that manages managed accounts of the employees, and a virtual currency server for managing virtual currency accounts of the employees wherein the servers are connected via a network, the provider server comprising: a calculation unit which calculates an advanceable amount for an employee based on a credit limit amount and attendance management data and transfers and manages electronic value information of an advance managed by a provider temporarily providing on behalf of the company based on the advanceable amount, an auto charge data output unit which performs a transfer processing of transferring electronic value information of the advance of a managed account to a virtual currency account, and an output means which outputs to the company server, the advance amount loaned to the employee by transferring the electronic value information of the advance from a managed account to a virtual currency account, wherein the total advanceable amount to the employees of a same company does not exceed the company's total advanceable amount range for the company as set by the provider.

(19) A method for providing a financial demand response provision service system according to another configuration which provides financial demand response services to employees belonging to a company having a company server that manages the credit limit for each employee, an attendance management data server for managing attendance management data of the employee, a provider server that manages managed accounts of the employee, and a bank server that manages a bank account to which the salary of the employee is transferred from the company wherein the servers are connected via a network, the method comprising: the provider server conducting the steps of: calculating an advanceable amount for an employee based on a credit limit amount and attendance management data and transferring and managing electronic value information of an advance managed by a provider temporarily providing on behalf of the company based on the advanceable amount, transferring the electronic value information of the advance of the managed accounts to the bank account, and outputting to the company server the advance amount loaned to the employee by transferring the electronic value information of the advance from the managed account to the bank account, wherein the total advanceable amount to the employees of a same company does not exceed the company's total advanceable amount range for the company as set by the provider.

(20) A provider server program according to another configuration which provides financial demand response services to employees belonging to a company having a company server that manages the credit limit for each employee, an attendance management data server for managing attendance management data of the employee, a provider server that manages managed accounts of the employee, and a bank server that manages a bank account to which the salary of the employee is transferred from the company wherein the servers are connected via a network, the program comprising: having a computer conduct the steps of: calculating an advanceable amount for an employee based on a credit limit amount and attendance management data and transferring and managing electronic value information of an advance managed by a provider temporarily providing on behalf of the company based on the advanceable amount, transferring the electronic value information of the advance of the managed accounts to the bank account, and outputting to the company server the advance amount loaned to the employee by transferring the electronic value information of the advance from the managed account to the bank account, wherein the total advanceable amount to the employees of a same company does not exceed the company's total advanceable amount range for the company as set by the provider.

According to the invention, providing a system, method, operator server, and program for a financial demand response provision service is possible which can be used in real time without relying solely on bank transfers on the employee side.

BRIEF DESCRIPTION OF DRAWINGS

FIG. 11 is a sequence diagram of a financial demand response provision service system.

FIG. 22 is a diagram for showing a company management screen of a financial demand response provision service system.

FIGS. 27A, 27B, 27C, and 27D are diagrams showing an example of the data structure of a storage unit.

DETAILED DESCRIPTION OF EMBODIMENTS OF THE INVENTION

Figure 1:
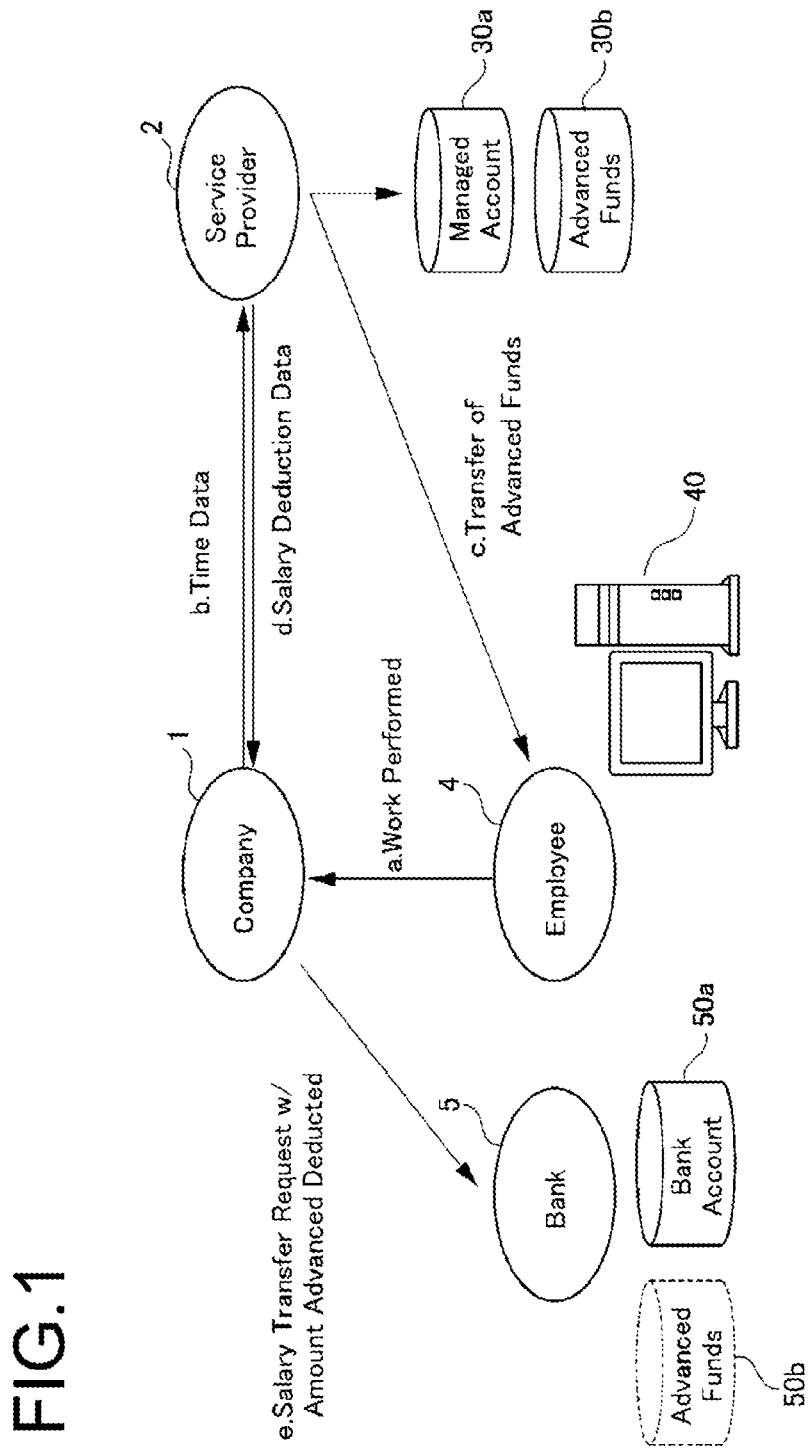
FIG. 1 is a conceptual diagram that focuses on the flow of data in a business model that implements the financial demand response provision service method of the present invention.

Hereinafter, with reference to the attached drawings, a first embodiment and a second embodiment (both of which refer to modes for carrying out the present invention) will be described in detail. The same elements are denoted by the same reference numerals or symbols throughout the descriptions of the first and second embodiments.

Common Configurations in the First Embodiment and the Second Embodiment

As shown in FIG. 1, the financial demand response provision service system 100 (see FIG. 4) is a system for a financial demand response provision service for one or more employees 4 belonging to a company 1.

Figure 4:
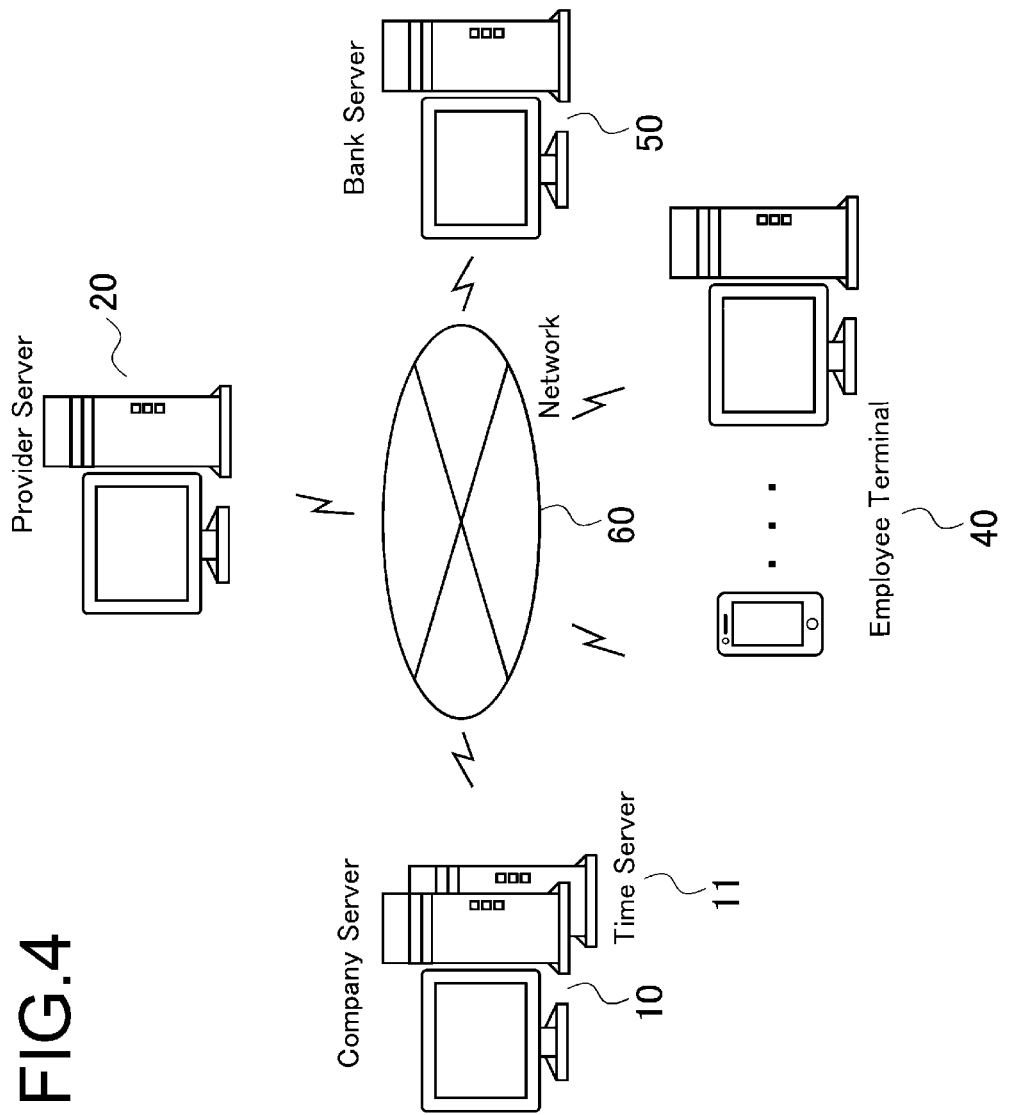
FIG. 4 is a conceptual diagram focused on the flow of the transfer of electronic value information in the business model of the financial demand response provision service system.

As shown in FIG. 4, a company server 10 that manages an actual advance amount(s) for an employee(s) 4 and an credit limit amount for the employee(s) 4, an attendance management data server 11 that manages attendance management data of the employee(s) 4, and a provider server 20 that manages a managed account(s) 30a of electronic value information for the employee(s) 4 are connected via a network 60 (see FIG. 1).

The provider server 20 has an advanceable amount calculation unit that calculates an advanceable amount for an employee 4 based on a credit limit amount managed by the company server 10 and the attendance management data managed by the attendance management data server 11, a transfer processing means that transfers the electronic value information based on the advance amount loaned to the employee 4 to the managed account 30a within the range of the advanceable amount from the electronic value information of the managed account 30a, and an output unit that outputs to the company server 10 the advance amount loaned to the employee 4.

The company server 10 reflects the advance amount from the provider server 20 in the actual advance amount and calculates the credit limit amount based on the actual advance amount.

In addition, preferably, the provider server 20 further includes a company credit management unit that manages company credit information based on the credit of the company 1. In this case, the advanceable amount calculation unit preferably further calculates the advanceable amount based on the company credit information.

Further, the provider server 20 preferably includes a usage fee calculation unit for calculating a usage fee for the financial demand response provision service based on the electronic value information transferred by a transfer processing means, and a billing unit for billing the usage fee to the company 1 or the employee 4.

Configuration of the First Embodiment

As shown in FIG. 1, this business model is realized by means of an employing company 1, a service provider 2, employee(s) belonging to the company 1, and a bank 5. Then, the service provider 2 calculates the advanceable amount for an employee 4 based on attendance management data of the employee 4 transmitted from the company 1, and performs a transfer processing for transferring electronic value information of an advance borrowed from an advanced funds 30b to the managed account 30a of an employee 4 within the range of the calculated advanceable amount.

Here, "managed account" refers to a fictional managed account 30a for an employee 4 managed by the service provider 2, and is, for example, an account for managing electronic value information.

The "transfer processing of the electronic value information of the advance" refers to a process for charging (increasing) the advance to the managed account 30a within the range of the advanceable amount.

In order to realize the above business model, company 1 is assumed to have an employment contract with the employee(s) 4, and the employee(s) 4 is(are) assumed to have applied for the financial demand response provision service with the service provider 2.

Moreover, the service provider 2 is assumed to be managing the managed account(s) 30a and the lending of the advance 30b of the employee(s) 4, and the company 1 is assumed to have entered into a payroll transfer agreement with a bank 5 for payroll transfers to one or more bank accounts 50a after subtracting the advance based on the usage record.

Note that here the service provider 2 is assumed to manage the managed account(s) 30a and advance(s) 30b, but the advance(s) 30b is(are) also assumed to be managed by the bank 5 (advance(s) 50b). Also, the company 1 is assumed to have obtained personal information license(s) from the employee(s) 4 and has obtained a contract to use this business model with the service provider 2 that provides the advance and the bank 5.

In addition, if the company 1 goes bankrupt, the employee(s) is(are) to be paid various insurance money. Therefore, a contract may be entered into to the effect that this insurance money may be used to satisfy any shortfalls with the advance for the employee(s) 4.

(Flow of Attendance Management (Time) Data)

First, an employee 4 performs some work for the company 1 based on the employment contract (step a).

Next, the company 1 transmits the attendance management data of the employee 4 to the service provider 2 that provides the financial demand response provision service (step b).

Then, the service provider 2 calculates an advanceable amount for the employee 4 based on the attendance management data or the range of the advanceable amount.

Here, at the time when the calculated advanceable amount increases (automatic charge to be described later) or at any time designated by the employee 4 (manual charge to be described later), electronic value information of an advance 30*b* is transferred to the managed account 30*a* managed for the employee 4 (hereinafter, referred to as an advance charge) (step c). As a result, the advance charge is stored in the managed account 30*a*.

The advance charge amount remaining in the managed account 30*a* without being used is reset (subtracted) at a predetermined date, for example, at the end of every month. Then, the company 1 acquires from the service provider 2 the salary deduction amount created on the basis of the usage results of the advance charge by the employee 4 (step d); the company 1 requests the bank 5 to transfer to the bank account 50*a* of the employee 4 the salary amount minus the advance amount already advanced (step e); and the bank 5 performs a transfer process based on the request.

The employee 4 inputs the user ID (a user ID may be recorded on a card) and password provided by the service provider 2 into an employee terminal 40 owned by the employee 4 in order to use the advance. The user ID and the managed account 30*a* are linked by identification information such as an employee number. The managed account 30*a* is assigned to an employee 4 who belongs to the company 1 and is managed by the service provider 2. By being linked by identifying information such as an employee number, the remaining balance is able to be managed based on the advance usage record.

Figure 2:
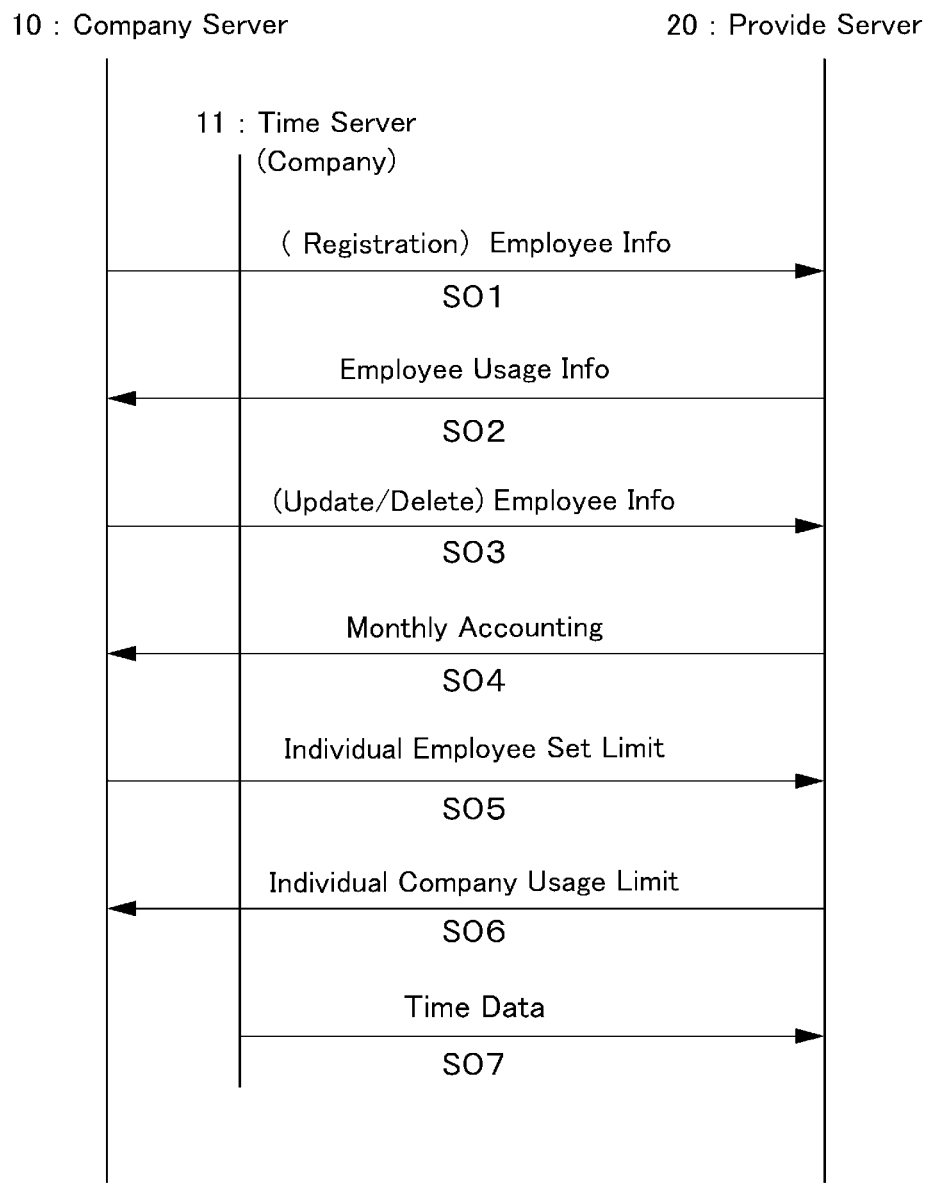
FIG. 2 is a sequence diagram of a financial demand response provision service system.

The roles of the company server 10, the attendance management data server 11, and the provider server 20 in the financial demand response provision service system will be described with reference to FIG. 2. The financial demand response provision service system includes a company server 10, an attendance management data server 11, and a provider server 20.

The company server 10 is a server that handles the information of the employee(s) 4. Although this embodiment is described as a so-called computer server, any employee 4 information handling system is applicable, including, for example, terminals and handwritten documents.

The information of the employee 4 includes a company ID, an employee ID, a card ID, or the like which will be described later.

The company server 10 sends the information of the employee as (registered) employee information to the provider server 20 (step S01).

The provider server 20 sends the advance amount for each employee 4 to the company server 10 as advance usage information (step S02).

If the information of an employee 4 belonging to the company 1 is updated or deleted, the company server 10 sends the employee information (update, delete) as employee information to the provider server 20 (step S03).

The provider server 20 sends, for example, a monthly accounting charge for monthly use of the financial demand response provision service to the company server 10 (step S04). The monthly accounting includes, for example, the sum of the amount advanced to the employee 4, and the fee for using the financial demand response provision service.

The company server 10 manages the usage limit for the employee 4. The credit limit amount is determined by the company 1, and for example, the credit limit amount may be raised or lowered based on the work status of the company 1 or the usage status (for example, amount advanced) of the financial demand response provision service. The company server 10 sends the credit limit amount as an individual employee set limit to the provider server 20 (step S05).

The provider server 20 manages company credit information related to the credit of a company (companies) 1. In this way, an advanceable amount can be determined for each company. Examples of the credit for a company can include capital, number of employees, asset information, financial information, usage of the financial demand response provision service, and continued usage of the financial demand response provision service. Based on these, the service provider 2 makes its own determination of the credit of a company.

Also, the service provider 2 managing the provider server 20 may procure advances 30*b* through a crowdfunding process that includes sending information on the financial demand response provision service and information on the advance to an unspecified number of people via the network 60. In this case, the company credit information also preferably may include advances 30*b* that were procured through crowdfunding.

The provider server 20 sends the company credit information as the usage limit for each company to the company server 10 (step S06).

The provider server 20 may manage usage limits for each company; the same predetermined usage limit may be set for multiple companies, and these may be managed; and of the plurality of companies, for some of the plurality of companies, the same predetermined usage limit may be managed, and for other of the plurality of companies, the usage limit may be managed for each company.

The attendance management data server 11 is a server that handles employee attendance management data. In this embodiment, although a so-called computer server is described, any embodiment is applicable to the present invention so long as it handles employee attendance management data, and includes, for example, a terminal or a handwritten document.

Employee attendance management data includes the company ID, employee ID(s), days worked, hours worked, etc., which will be described later, and is shared in a predetermined format.

The attendance management data server 11 sends an employee's attendance management data to the provider server 20 (step S07). The timing of sending (frequency of sharing) from the attendance management data server 11 to the provider server 20 is not particularly limited, and may be, for example, every day, once a week, or on a specific day of the week.

Figure 3:
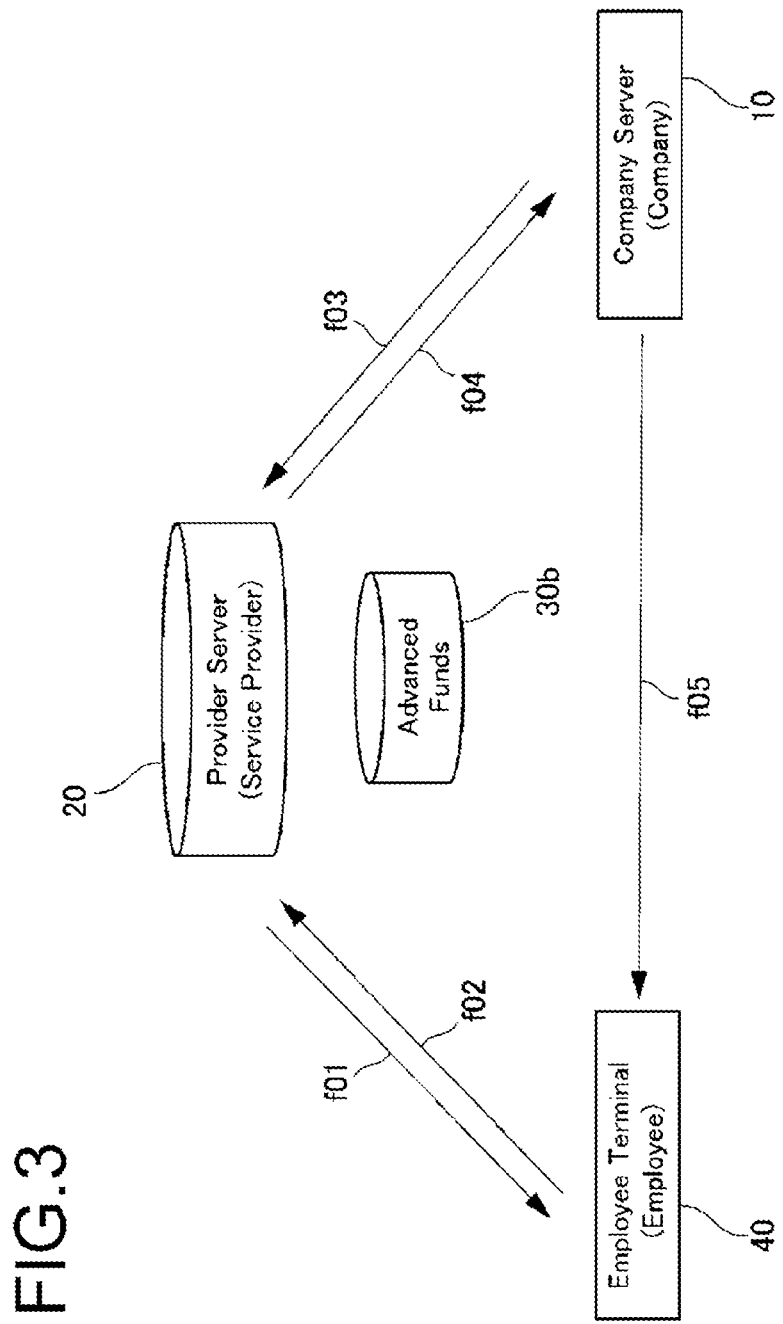
FIG. 3 is a system configuration diagram of a financial demand response provision service system.

As shown in FIG. 3, a company 1 has a company server 10, the service provider 2 has a provider server 20, and an employee 4 has an employee terminal 40.

The employee 4 operates the employee terminal 40; then, when the financial demand response provision service system 100 is used for the provider server 20 (flow f01), the amount of the advance charge which is stored in the managed account 30*a* is transferred to the bank account 50*a* of the employee 4; and that is displayed on the employee terminal 40. Thereby, the employee 4 is able to receive money.

At this time, the service provider 2 collects, from the advance charge, a fee from the employee 4 for using the financial demand response provision service system 100. In other words, the employee 4 pays the service provider 2 a usage fee (flow f02). The payment of the usage fee is made by the provider server 20 transferring the advance charge minus the usage fee to the bank account 50*a* of employee 4, and displaying the breakdown on the employee terminal 40. Therefore, the amount that the employee 4 is able to receive is the amount obtained by subtracting the usage fee from the advance charge.

The service provider 2 bills the company 1 based on the billing data created which is based on the usage record of the advance charge by the employee 4 (flow f04), and the company 1 pays the advance 30*b* based on the billing data (flow f03).

The company 1 then deducts from the salary the amount that the employee 4 used based on the usage of the advance charge on the closing date of an employee's pay and pays the employee 4 (flow f05).

(System Configuration)

As shown in FIG. 4, the financial demand response provision service system 100 comprises an attendance management data server 11 that manages an employee attendance management data at the company, a provider server 20 that manages the managed account 30*a* for the employee 4 and the advance 30*b* loaned to the employee 4, as well as provides the financial demand response provision service by using the advance 30*b*, a bank server 50 that manages the bank account 50*a* of the employee 4, and an employee terminal 40 owned by the employee 4, these servers are connected via a network 60 such as an IP (Internet Protocol) network. In addition, the company 1 also has a company server 10, which manages employee data of the employee 4 belonging to company 1, for payroll accounting processing, and similar to the attendance management data server 11 described above, is connected to the network 60.

Note that the company server 10, the attendance management data server 11, the provider server 20, and the bank server 50 include the entire computer system managed and operated by each of the company 1, the service provider 2, and the bank 5. Further, the employee terminal 40 refers to a terminal such as a mobile phone, a smart phone, a PC (Personal Computer), etc. possessed by the employee 4 and all of which are able to connect with the network 60.

Note that the financial demand response provision service system 100 may also realize the above-described business model by using the card payment network of a card company (not shown), which is different from a network 60 such as an IP network. That is, the processing destination of the transfer processing of the electronic value information of the advance may be a managed account for card payment of the card company.

In this case, the employee 4 can carry out shopping at a member location and deposit/withdraw money from a partner ATM (Automatic Teller Machine) via the possessed card. In addition, if the card is a debit card with a credit card number, the card can be used for online shopping.

Alternatively, a virtual currency such as bitcoin, apple pay or a bank transfer may be used to realize the above business model.

In recent years, in order to facilitate card settlement, card terminals for card settlement have been standardized, and for credit payments, standard specifications such as EMV (EuroPay International, MasterCard International, and Visa International; registered trademarks) and domestic applications are being used, while banks have established Federation Bankers' Association specifications. As an example of a standard specification, a general-purpose payment network system, such as CAFIS (Credit And Finance Information System: registered trademark), is widely used in which card management companies for payment at the national level, distribution companies and third parties such as financial institutions (settlement companies), affiliated stores, etc. are connected online and payments are made using a card such as a credit card or a cash card.

Also, in order to differentiate from other companies, a payment network of brands can be established for each payment card operating company instead of a general-purpose payment network based on a strategy for collecting payment cards with a unique service by the payment card operating company. For example, JCN (Japan Card Network; Registered Trademark) in the case of JCB (JCB; Registered Trademark), or VisaNet (Visa Net; Registered Trademark) in the case of VISA (Visa International; registered trademark), and these payment networks are used as payment networks to replace CAFIS.

(Block Diagram)

Figure 5:
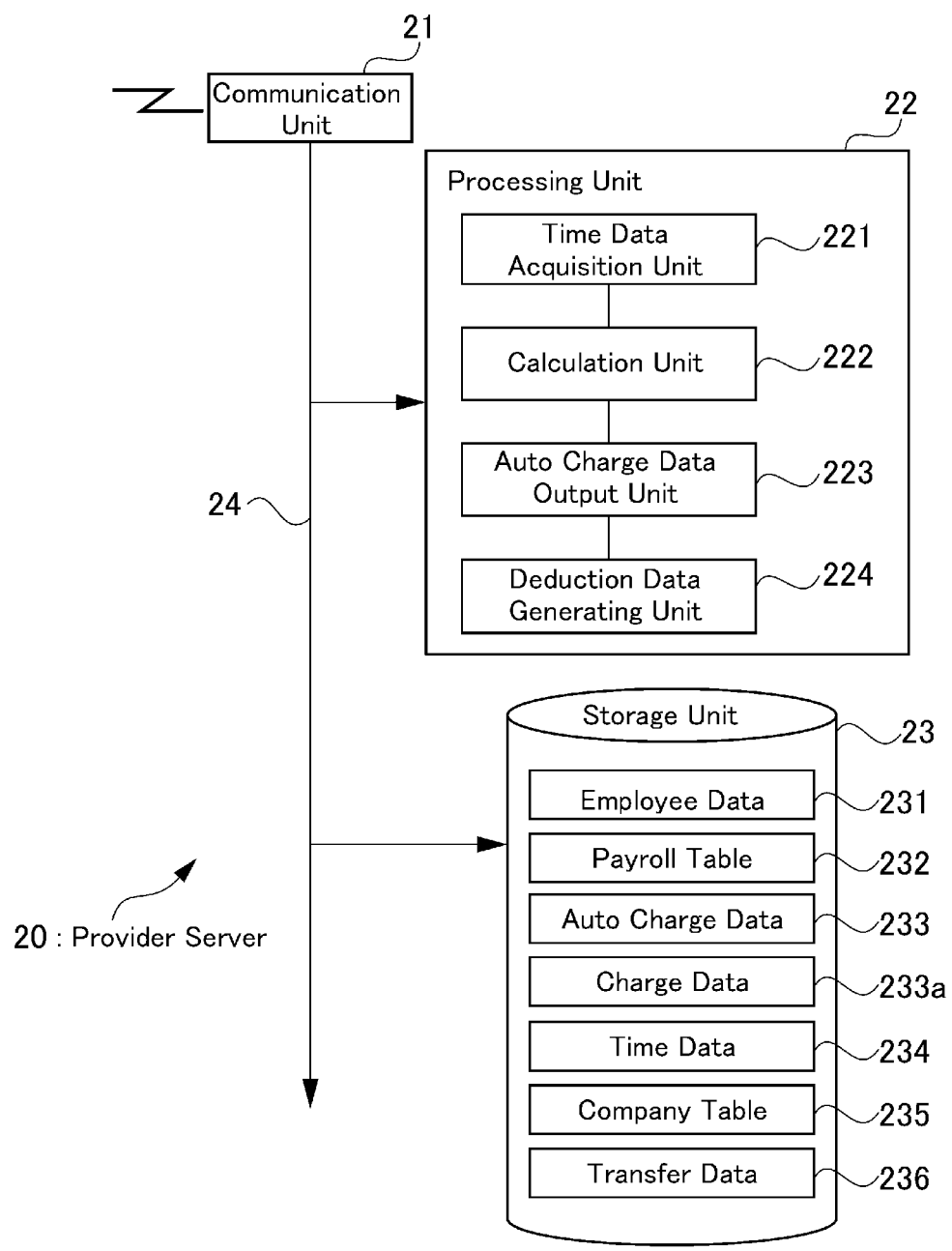
FIG. 5 is a block diagram showing the configuration of a provider server of the financial demand response provision service system.

As shown in FIG. 5, there is a communication unit 21, a processing unit 22 and a storage unit 23 in the provider server 20 which are commonly connected via a bi-directional input/output bus 24 composed of a plurality of lines for addresses, data, and control.

The communication unit 21 is a communication LSI (Large Scale Integration) that carries a communication interface between the network 60 and the provider server 20 (processing unit 22), and for example, file transfer linked by the API (Application Program Interface) is performed between the company server 10 connected to the network 60 by TCP/IP (Transmission Control Protocol/Internet Protocol).

The processing unit 22 calculates the advanceable amount for the employee 4 based on the attendance management data of the employee sent from the company server 10, and performs a transfer processing to transfer the electronic value information of the advance which is within the range of the calculated advanceable amount to the managed account 30*a* for the employee 4 in accordance with the program of this embodiment, for example, which is installed in a micro processer that is mounted in or installed in the program area in the storage unit 23 (not shown), and this is done in cooperation with the communication unit 21 and the storage unit 23.

In order for the processing unit 22 to calculate the advanceable amount for the employee 4 based on the attendance management data of employee 4 sent from attendance management data server 11 and transfer the advance which is within the calculated advanceable amount range as electronic value information to the managed account 30*a* of the employee 4, an attendance management (time) data acquisition unit 221, a calculation unit 222, an auto charge data output unit 223, and a deduction data generating unit 224 are provided as program execution means.

The attendance management data acquisition unit 221 acquires the attendance management data of the target employee 4 from the attendance management data server 11 via the communication unit 21.

The auto charge data output unit 223 performs transfer processing for transferring the electronic value information of the advance.

The deduction data generating unit 224 generates the amount used by the employee as salary deduction data from the electronic value information of the already transferred "advance".

The storage unit 23 is mounted with, for example, a semiconductor storage element such as SRAM (Static Random Access Memory), DRAM (Dynamic Random Access Memory), flash RAM, or a large capacity storage element such as one with light or magnets, and in the embodiment described above in addition to the programs, the employee data 231, payroll table 232, auto charge data 233, charge data 233 an attendance management data 234, company table 235, and transfer data 236 are also stored in the work area.

Figure 6:
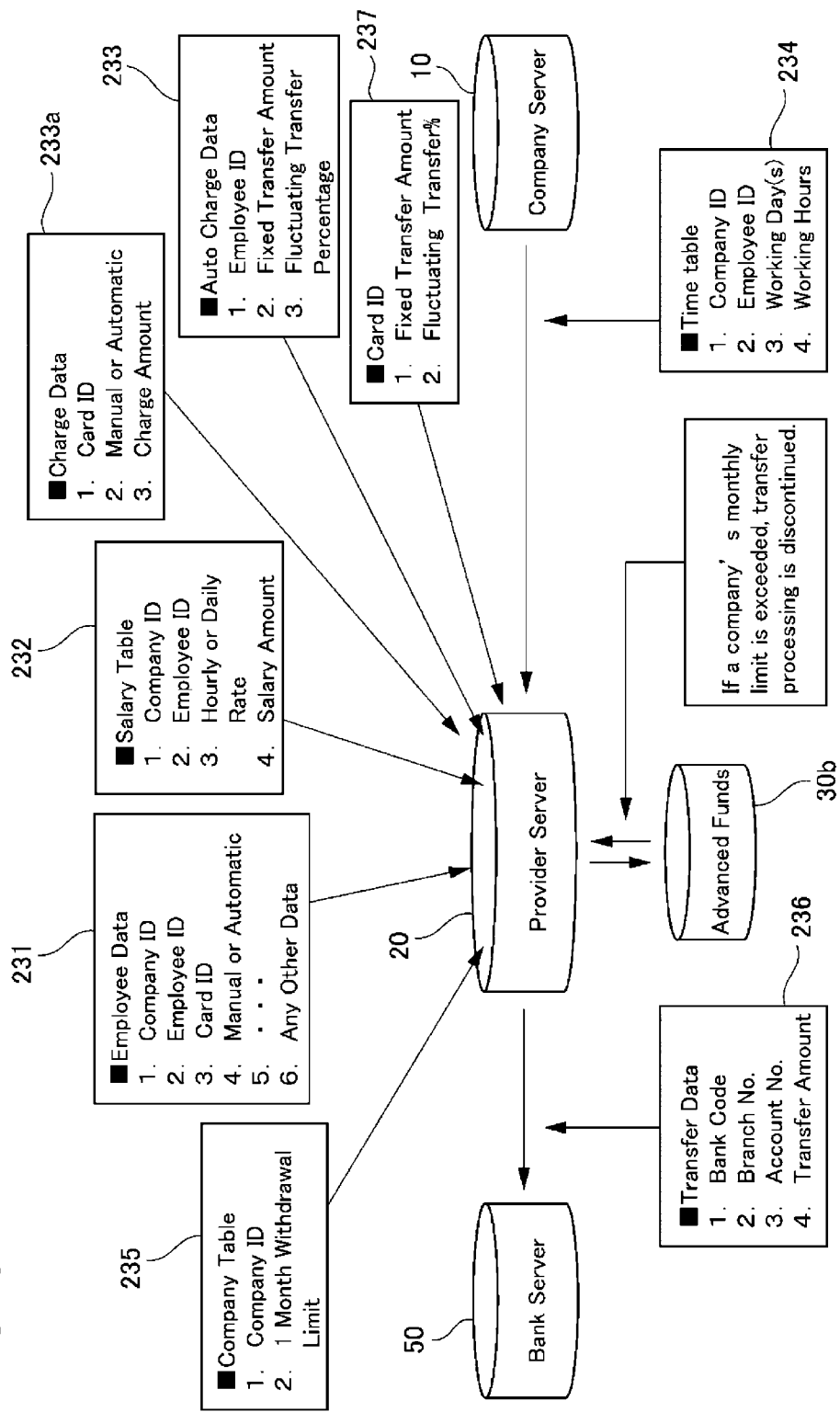
FIG. 6 is a schematic diagram for describing a data structure stored in a storage unit and a data structure to be transmitted and received in the financial demand response provision service system.

As shown in FIG. 6, the employee data 231 has as data items at least a "company ID" which is uniquely assigned to each company 1 that has entered into a contract for using this business model, and in which the company 1 has entered into employment contract(s), an "employee ID" uniquely assigned to each employee 4 who applied for use of this business model beforehand, and a "manual or automatic" designation which indicate whether to transfer the electronic value information of advance 30b automatically or manually.

The payroll table 232 is input and transferred by a company representative based on the employment contract(s), and has at least the "company ID (identification)", "employee ID", "hourly or daily rate" and "salary amount" as data items.

The auto charge data 233 is generated by the processing unit 22 (auto charge data output unit 223 or deduction data generating unit 224), and has at least the "employee ID", the "fixed transfer amount", and the "fluctuating transfer percentage" as data items.

The charge data 233a has at least a "card ID", "manual or automatic", and a "charge amount" as data items.

The attendance management data 234 has at least "company ID", "employee ID", "working day(s)" and "working hours" as data items, which are input and transferred by a company representative.

The company table 235 has a "company ID (identification)" identifying the company and a "one-month withdrawal limit" as data items.

The transfer data 236 is information necessary for making transfers to the bank account 50a of an employee 4 and includes "bank code", "branch number", "account number", and "transfer amount" as data items.

The card ID (237) has at least "fixed transfer amount" and "fluctuating transfer amount" as data items.

The employee data 231, payroll table 232, auto charge data 233, charge data 233 an attendance management data 234, company table 235, transfer data 236, and card ID (237) are all created in a CSV format for transfer. In addition, employee data 231, payroll table 232, auto charge data 233, and attendance management data 234 are linked by company ID and employee ID.

Operation of the Embodiment

First, how employees choose a advance method will be explained, and then how to handle financial demand processing will be explained; after that, the method of financial demand response tabulation process will be explained.

(How to Choose Advance Method)

Figure 9:
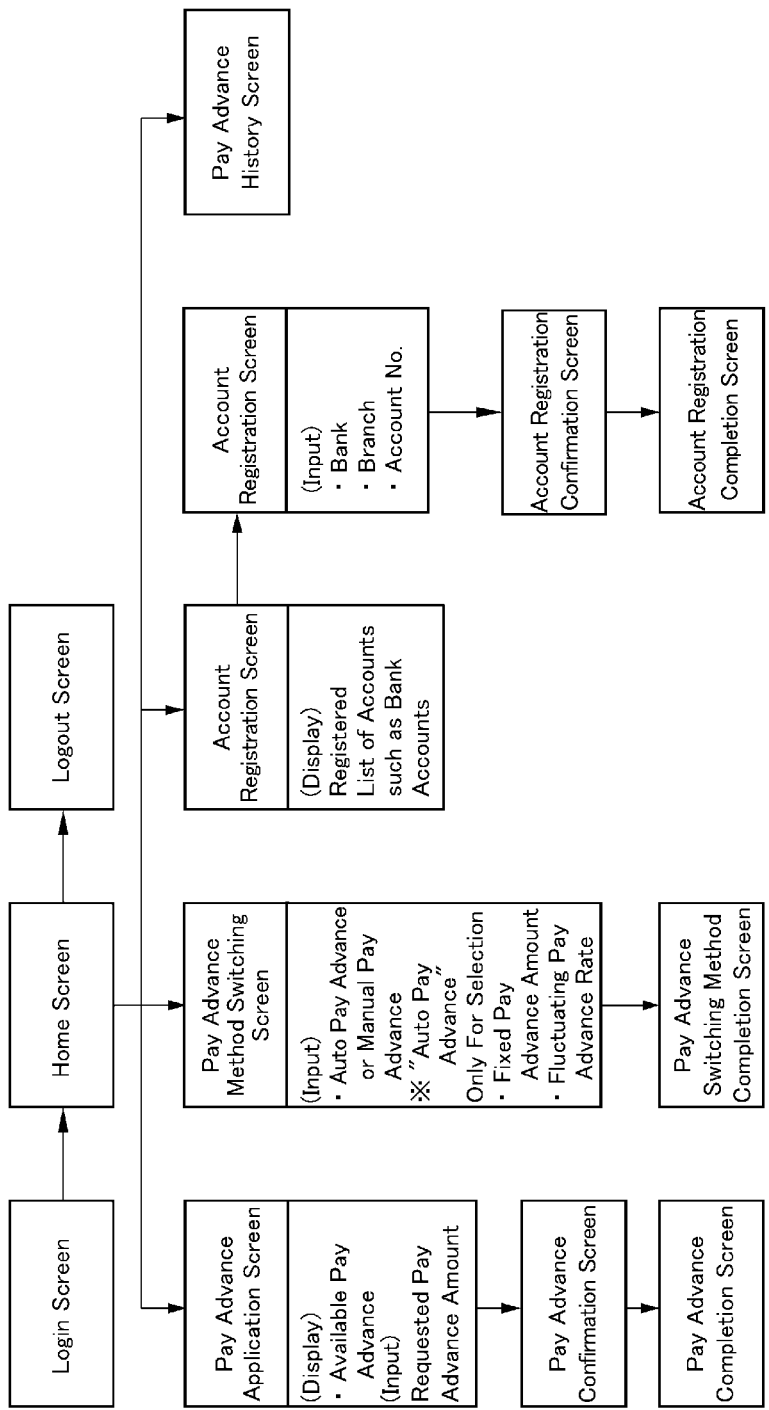
FIG. 9 is a screen transition diagram of an employee terminal.
Figure 10A:
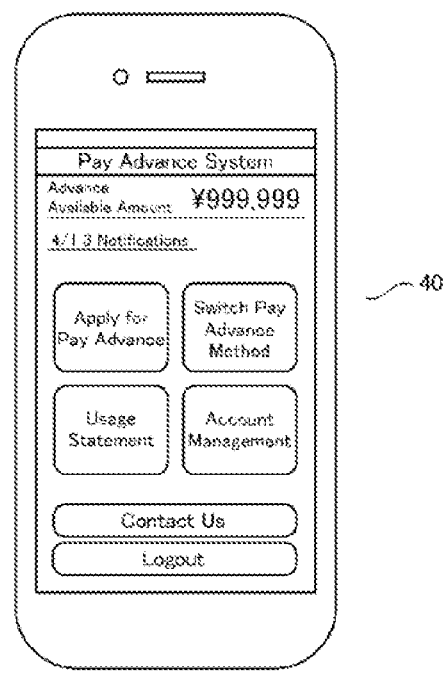
FIG. 10A is a diagram showing an example of a home screen configuration.
Figure 10B:
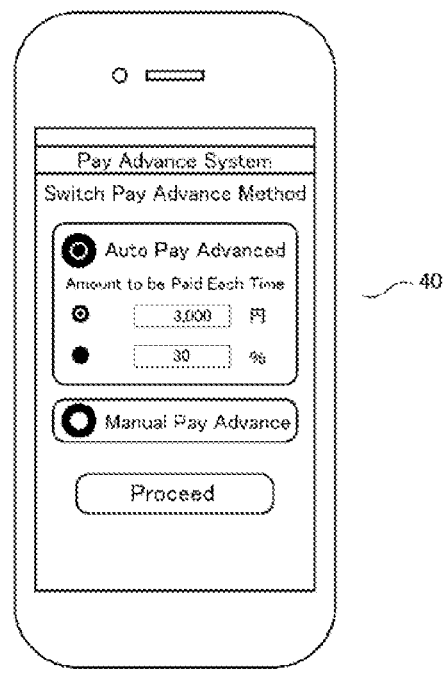
FIG. 10B is a figure showing an example of a charge switching screen.

First, using the employee terminal 40, the employee 4 selects "Switch Advance Method" from the screens shown in FIGS. 9 and 10A; then, from the screen shown in FIG. 10B, transmit beforehand the selection information indicating that the transfer of the electronic value information of the advance is to be performed automatically or manually. Furthermore, if the selection information indicates that the transfer should be done automatically, the employee 4 uses the employee terminal 40 to send additional information for instructing whether to increase the amount of transfer processing as a fixed amount determined beforehand, or to indicate that the amount fluctuates based on predetermined rate fluctuation.

As a result, the provider server 20 acquires the "manual or automatic" item with respect to the employee data 231, and the items "fixed transfer amount" and "fluctuating transfer percentage" for the auto charge data 233 are included.

(How to Handle Financial Demand Processing)

Figure 7:
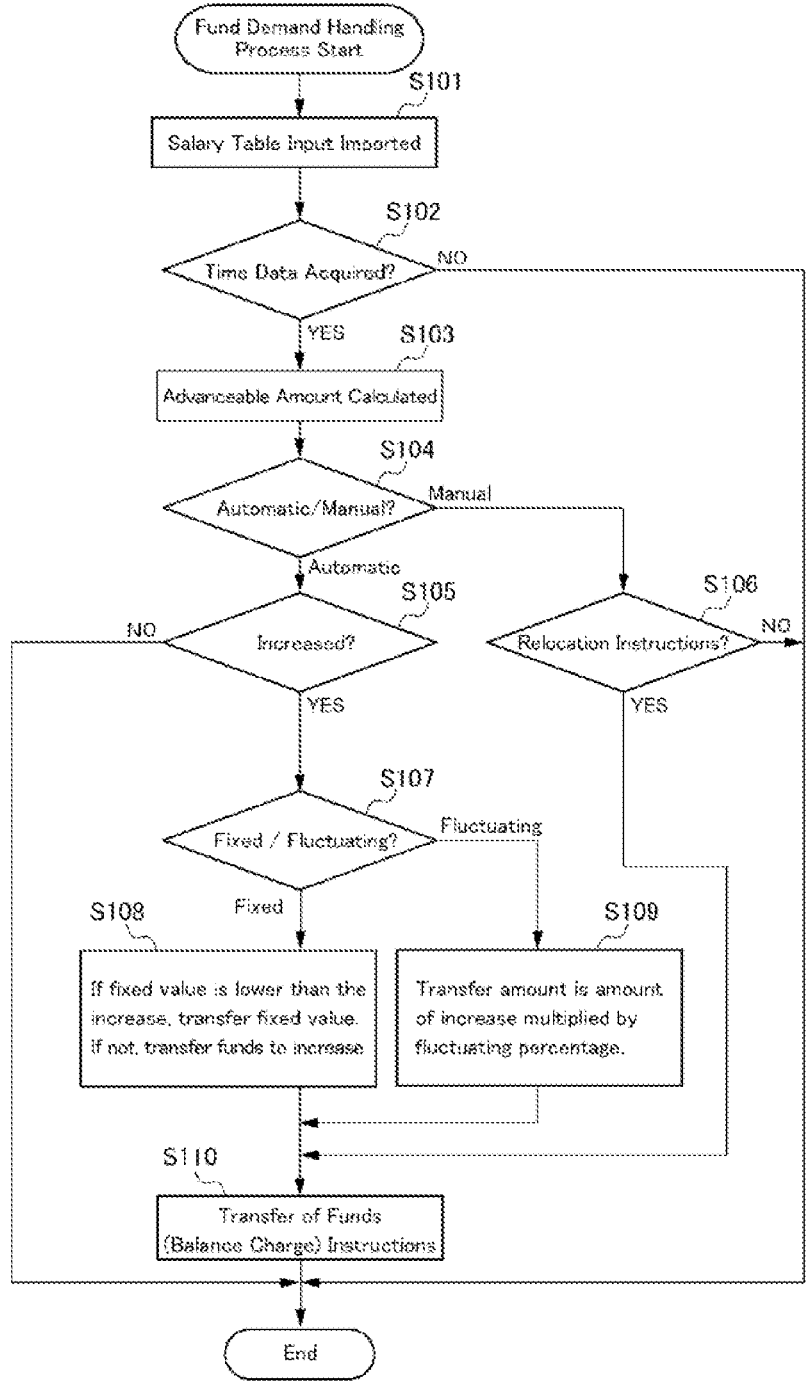
FIG. 7 is a flowchart showing the processing operation of the provider server.

The processing operation of the provider server 20 will be described below with reference to FIGS. 7 and 8.

How to handle financial demand processing will be explained. The method of the financial demand handling process generally calculates the advanceable amount based on the attendance management data of an employee 4 received regularly (every day, etc.). The calculated advanceable amount is managed by the managed account 30a. If an employee 4 has set the setting to automatic charge beforehand, when there is an increase in the advanceable amount, a predetermined amount within the range of the advanceable amount is transferred to the bank account 50a of the employee 4. Details will be described below.

In the provider server 20, first, the processing unit 22 inputs and imports the payroll table 232 in the CSV format generated by the company server 10 (step S101).

Subsequently, when the attendance management data acquisition unit 221 fetches the attendance management data 234 in CSV format by file transfer from the attendance management data server 11 through the communication unit 21 ("YES" in step S102), the calculation unit 222 calculates the advanceable amount (step S103).

The advanceable amount that the calculation unit 222 calculates refers to the storage unit 23 at the time when the attendance management data 234 is received from the attendance management data server 11, and the advanceable amount is calculated based on the salary (hourly salary/daily salary) per predetermined time unit stored in the payroll table 232 and the working hours according to the attendance management data 234 of the employee 4. The electronic value information corresponding to the calculated advanceable amount is managed by the managed account 30a of the employee 4.

As an example of the advanceable amount, after completing 8 hours of work with a pay rate of 10,000 JPY per hour, and the advanceable rate set as 70%, the wages earned will be 80,000 JPY and the advanceable amount will be 56,000 JPY.

Note that if the calculation unit 222 has received selection information indicating that the transfer of the electronic value information of the amount is to be performed automatically beforehand (automatic charge) from the employee terminal 40, the calculation unit 222 also performs processing to reset the advance amount not used as of the payroll date, and furthermore, the deduction data generating unit 224 performs a calculation processing for generating the amount used by the employee 4 out of the advanced charged amount as salary deduction data.

If the auto charge data output unit 223 has received selection information indicating that the transfer of the electronic value information of the amount is to be performed "automatically" (automatic charge) beforehand from the employee terminal 40 instructing, i.e. when the selection information is selected to be automatically performed ("automatic" in step S104), then while the electronic value information of the advanceable amount managed by the managed account 30a of the employee 4 at the time when the advanceable amount increases ("YES" in step S105), the auto charge data output unit 223 transfers the electronic value information corresponding to the predetermined advanceable amount increase from the managed account 30a of the employee 4 to the bank account 50a.

If the auto charge data output unit 223 indicates that the increase information is to be fixed ("fixed" in step S107), the predetermined advanceable amount increase is fixed if the fixed amount is lower than the advanceable amount increase, and if the increase is lower than the fixed amount, the increase is taken (step S108).

As a result, a fixed amount from the increased advance amount can be transferred to the bank account 50a.

Further, if the auto charge data output unit 223 instructs that the increase information is fluctuating ("fluctuating" in step S107), the predetermined advanceable amount increment is an amount obtained by multiplying the increase amount by the fluctuating rate. (Step S109).

As a result, because an amount multiplied by a fixed percentage of the increased advance amount can be transferred to the bank account 50a, a large amount based on the amount of work is transferred for the employee.

The predetermined advanceable amount increment obtained in this manner is stored in a predetermined area (auto charge data 233) of the storage unit 23, and transfer (advance charge) of electronic value information of the advance is executed (step S110).

On the other hand, if the selection information has been received beforehand from the employee terminal 40 to transfer "manually (manual charge)" the electronic value information of the advance ("manual" in step S104), then from the electronic value information of the advanceable amount as managed by the managed account 30a of the employee 4 at the time when the transfer instruction is given from the employee terminal 40 ("YES" in step S106), a transfer process for transferring the electronic value information corresponding to the prescribed amount in the transfer instruction information from the managed account 30a of the employee 4 to the bank account 50a of the employee 4 is performed (step S110).

The instructions for transfer from the employee terminal 40 are performed by transmitting transfer instruction information for instructing the transfer of a predetermined amount from the employee terminal.

For this reason, an advance can be performed at the time based on an employee's 4 own intention.

Also, if the total of the electronic value information subject to a transfer processing within a predetermined period (for example, a one-month period) exceeds electronic value information corresponding to a preset withdrawal limit, then the auto charge data output unit 223 may cancel the transfer process.

(Method of Financial Demand Response Tabulation Process)

Next, the method of financial demand response tabulation process will be explained.

Figure 8:
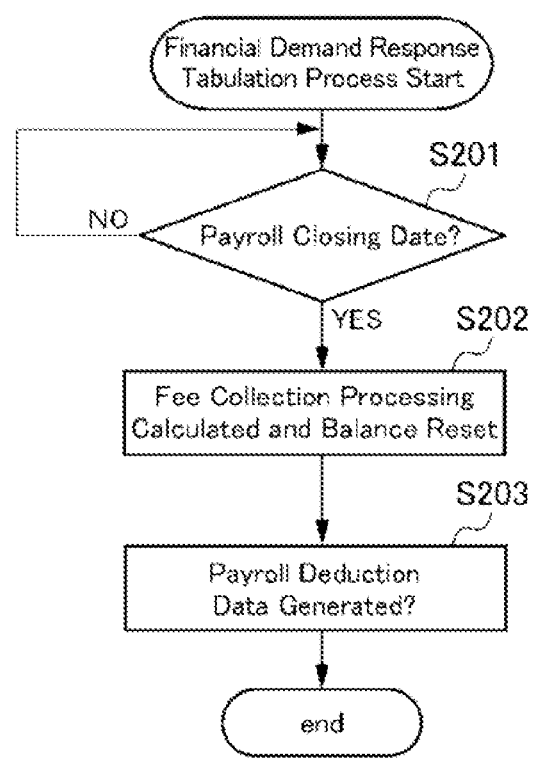
FIG. 8 is a flow chart showing shows financial demand response tabulation process of a provider server.

As shown in FIG. 8, when the salary closing date comes ("YES" in step S201), the provider server 20 (calculation unit 222) performs the calculation of a fee collection processing (details to be described later) and a processing of resetting the electronic value information of the transferred advance that had not been used by the payroll closing date (step S202).

Each time the auto charge data output unit 223 performs transfer processing, the calculation of the fee collection process is performed by converting the transfer processing transfers targets to the electronic value information obtained by subtracting the electronic value information corresponding to the transfer processing fee from the corresponding electronic value information, instead of the corresponding electronic value information.

Subsequently, the deduction data generating unit 224 generates the amount used by the employee 4 as obtained from the calculation unit 222 as salary deduction data (step S203).

That is, the deduction data generating unit 224 generates from the electronic value information of the transferred advance in the CSV format the amount used by the employee as the salary deduction data.

Then, the company server 10 acquires salary deduction data (CSV) generated by the deduction data generating unit 224 from the provider server 20 (deduction data generating unit 224) by periodically (e.g., the end of the month) or irregularly (employee busy period or off season) downloading the deduction data, and requests performing the transfer processing to the bank account 50a of the employee 4 of the transfer amount minus the advance used to the bank server 50.

(Screen Transition Diagram of Employee Terminal)

As shown in FIG. 9, on the LCD (Liquid Crystal Display) monitor of an employee terminal 40, a login screen, a home screen, and a logout screen are displayed. From the "home screen" of which an example of the screen configuration is shown in FIG. 10A, transitions between the "advance application screen", "advance method switching screen" whose screen configuration is shown in FIG. 10B as an example, and the "advance history screen" are possible.

As shown in FIG. 10A, on the "Home screen", in addition to the advance available amount, buttons for advance application, advance method switching, usage statement, and account management are provided, and when an employee 4 selects (taps) one of these buttons, the advance application screen, advance method switching screen, viewing of usage statement, and account management, which are services corresponding to the respective buttons, are executed.

Further, as shown in FIG. 9 and FIG. 10B, on the "advance method switching screen", a radio button has been assigned to switch between automatic advance (automatic) and manual advance (manual). By the employee 4 operating the employee terminal 40 at the first login and by making one of them valid and pressing the proceed button, at the time when the advanceable amount increases, switching the selection information that instructs an automatic or manual transfer of the electronic value information of the advance is possible. Here, when auto prepayment is selected, "fixed" and "fluctuating" radio buttons become selectable, and depending on the selected radio button, the "fixed advance amount" or "fluctuating advance rate" input fields can also be entered.

When the employee 4 inputs a predetermined number in the input field and taps the determination button, the screen transitions to an "advance method switching completion screen" (not shown), and the advance method switching is completed.

Then, when the employee 4 confirms (a tap of the OK button which is not shown), the "prepayment completion screen" is displayed.

The "fixed advance amount" is for transferring the amount of the increased advance amount (the predetermined advanceable amount increase amount), which is input in the fixed advance amount field. That is, when the fixed advance amount is lower than the increase amount of the advanceable amount, the fixed advance amount is transferred to the bank account 50*a* and if the increase amount of the advanceable amount is lower than the fixed advance amount, the increase amount of the advanceable amount is transferred to the bank account 50*a*.

Note that if the "advance application screen" is selected in FIG. 9, when the advance allowance frame is displayed on the LCD monitor of the employee terminal 40 and the employee 4 inputs a advance application amount within the allowance, the screen transitions to a "advance confirmation screen" (not shown). Then, the employee 4 confirms (a tap of the OK button which is not shown), and the "advance completion screen" is displayed.

In addition, on the "account management screen", a list of accounts such as registered bank accounts is displayed, and if the "Account registration screen" is selected, the employee 4 needs to input the name of the bank and the branch and the account number via the employee terminal 40. When these necessary items are input, the screen changes to the "account registration confirmation screen", and transitions to the "account registration completion screen" when confirmed by the employee 4.

When the provider server 20 receives the attendance management data of an employee 4 from the attendance management data server 11, and receives the salary per predetermined time unit as defined in the employment contract (employment conditions) of the employee 4, the advanceable amount may be calculated based on the actual working hours based on the attendance management data of the employee 4 and a transfer processing of the electronic value information of the advance may be performed. Note that when calculating the advanceable amount, if hourly rate is not specified in the employment conditions, a pattern may be considered in which the amount of the monthly salary is divided by the day increases with time and date, or a pattern with a fixed amount, for example, in which up to 100,000 yen can be used as the advanceable amount when working half of the month.

If the provider server 20 has received selection information beforehand for automatically transferring the electronic value information of the advance from the employee terminal 40 (automatic charge), then the transfer process of electronic value information of the advance may be performed at the time when the advanceable amount increases. On the other hand, if selection information for manually transferring the electronic value information of the advance has been received from the employee terminal 40 beforehand (manual charge), then the transfer processing of electronic value information of the advance may be performed at the time when there is a transfer instruction from the employee terminal 40.

If automatic charge has been selected, the provider server 20 resets the amount of the electronic value information of the transferred advance that has not been used as of the payroll day (the end of each month), and the amount used may be generated as salary deduction data. The company server 10 is obtained by downloading the salary deduction data generated by the provider server 20, and after deducting the advance amount, performs the transfer processing to the bank server 50 of the amount minus the advance amount to the bank account 50*a* of the employee 4.

The use of the advance charge advance amount is managed by the selection information input when the employee 4 logs in to the provider server 20. That is, if the provider server 20 has received the selection information from the employee terminal 40 beforehand instructing that transfer of the electronic value information of the advance be done "automatically", then a transfer processing is performed to transfer the electronic value information of advance at the time when the advanceable amount is increased by a predetermined amount. On the other hand, if the selection information that has been received from the employee terminal 40 beforehand instructs that the transfer of the electronic value information of the advance be done "manually", then at the time when an instruction for transfer is given from the employee terminal 40, transfer processing is performed to transfer the electronic value information of the advance.

(When Involving Multiple Companies)

As shown in FIG. 11, the financial demand response provision service is also able to respond to the employees 4 who belong to a plurality of companies 1. That is to say, an employee 4 who uses the financial demand response provision service can receive advances from a plurality of companies using the financial demand response provision service. When an employee 4 applies for an advance, the employee 4 is able to select any company for which the auto charge advance is available.

The service provider 2 may issue a financial demand response provision service account for each company. The account is preferably managed by an account ID or a card ID provided on the issued card. By issuing an account to the employee, a company ID issued to the company is also able to be associated. The method of associating the employee with the company may be performed automatically, manually, or in combination.

Hereinafter, an employee 4 belonging to Company A having the company server 10*a* and the attendance management data server 11*a*, and Company B having the company server 10*b* and the attendance management data server 11*b* will be described in detail.

First, the employee 4 applies to the service provider 2 for providing financial demand response provision service for Company A and for providing financial demand response provision service for Company B.

The service provider 2 exchanges the employee information (registration, update, deletion), usage limit, and time information between the provider server 20 and the company server 10*a* and the attendance management data server 11*a* of Company A. Similarly, the service provider 2 exchanges the employee information (registration, update, deletion), usage limit, and time information between the provider server 20 and the company server 10*b* and the attendance management data server 11*b* of Company B.

(How to Choose Advance Method)

Figure 12:
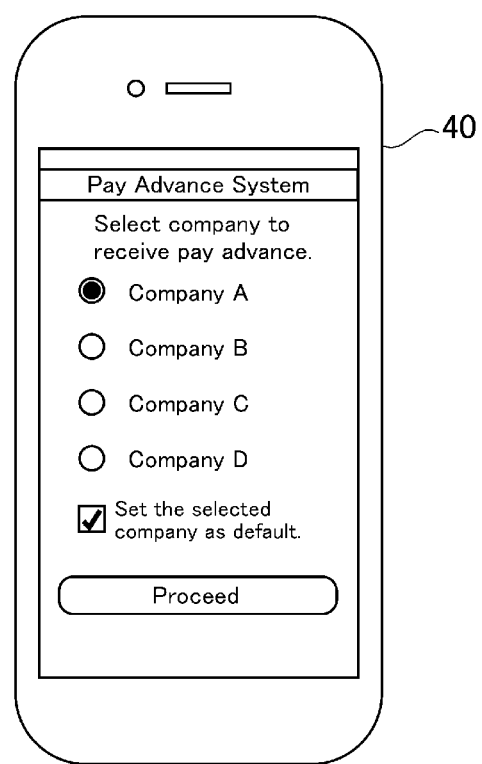
FIG. 12 is a diagram of an employee terminal switching screen.

The employee 4 operates the employee terminal 40, and the financial demand response provision service system 100 can be used to access the provider server 20 in the operation screen as shown in FIG. 12.

At this time, the employee 4 is able to receive an advance by applying for an advance by selecting which company the advance is to be used.

FIG. 12 shows an operation screen. The employee 4 can select the company from which the advanced will be received by operating the operation screen. A default setting function of the previously chosen company selected by the employee 4 for the advance may appear the next time the operation screen is started.

Also, based on evaluation criteria of the financial demand response provision service offering system, the financial demand response provision service system may select a company from which to receive the advance without letting employee 4 make the selection.

In addition, depending on the evaluation of the financial demand response provision service, the applied for advance amount may be divided and received from multiple companies. If the advance is divided, the financial demand response provision service system may use its own system-specific basis, such as even division or slope distribution division.

(Fee Collection Process)

Figure 13:
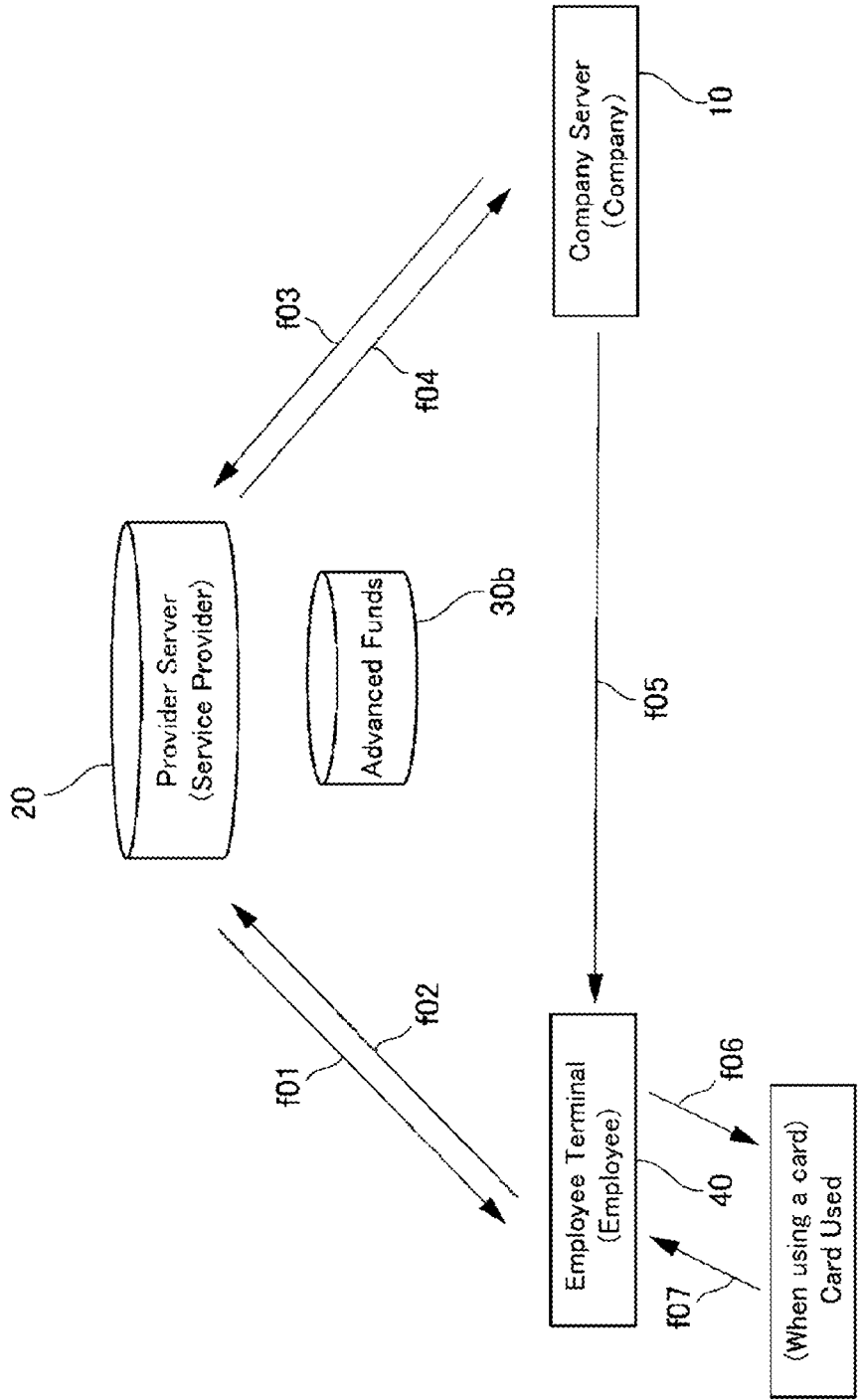
FIG. 13 is a system configuration diagram of a financial demand response provision service system.

A method of fee collection processing for when an employee 4 uses the financial demand response provision service system with a card (the usage of the card will be described in detail in the second embodiment) will be described using FIG. 13.

When an employee 4 uses the employee terminal 40 and the card (flow f07, f08) to perform a procedure to receive a predetermined advance amount (prepayment of salary) (flow f01), the advanceable amount is increased by the available advance. The provider server 20 collects a fee as a system usage fee from the card usage amount (flow f02).

The provider server 20 calculates the amount of the advance to the employee 4 on the closing date, and the service provider 2 bills the company 1 based on the advance (billing data) created based on the usage results of the advance charge by the employee 4 (flow f04), and the company 1 pays the amount advanced (flow f03).

The company 1 pays the employee 4 by deducting from the salary the amount used by the employee 4 based on the advance charge use on the closing date of the employee's salary (flow f05).

That is, when an employee 4 uses the advance system and receives a salary advance, a fee is collected and the remaining amount is transferred to the employee's bank account; then, the company 1 deducts the employee's 4 card usage amount from the salary and pays the employee 4. Preferably, the data regarding salary deduction can be downloaded from the financial demand response provision service system.

Figure 14:
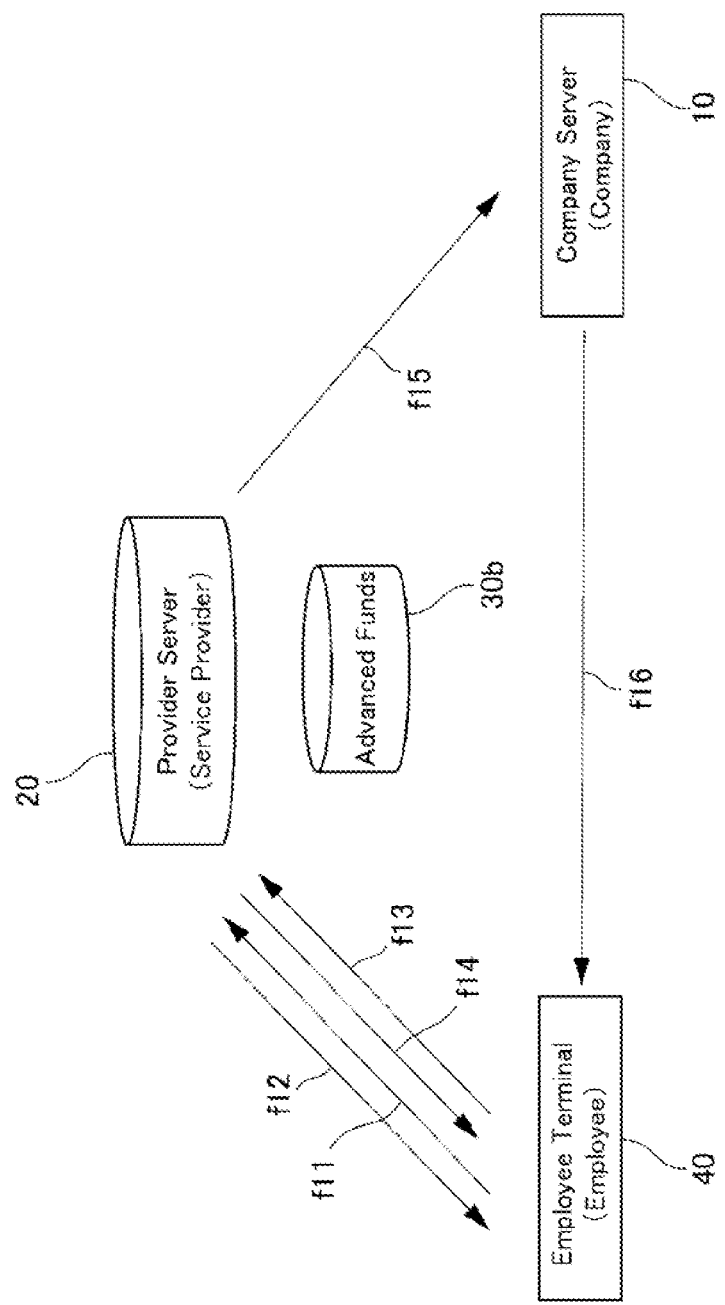
FIG. 14 is a system configuration diagram of a financial demand response provision service system.

Using FIG. 14, another method of fee collection processing for when an employee 4 uses the financial demand response provision service system will be described.

When an employee 4 performs a procedure to receive a predetermined advance amount (prepayment application amount) using the employee terminal 40 (flow f11), the provider server 20 charges the card with the advance amount (flow f12), and the advanceable amount is increased by the advance amount.

When the employee 4 uses the card (flow f13), and the card usage amount (purchase amount) and card use fee is subtracted on from the card's balance (advanceable amount) (flow f14).

The provider server 20 totals the advance amount loaned to the employee 4 on the closing date; the service provider 2 bills the company 1 based on the billing data created based on the usage history of the employee's 4 advance charges (flow f15); and The company 1 pays advance 30*b* based on the billing data.

The company 1 deducts the advance amount on the closing date of the employee 4 from the salary and pays the employee 4 (f16).

That is, when the employee 4 uses the financial demand response provision service system, the provider server 20 charges the card the amount requested to be advanced by the employee 4 (full charge with respect to the input amount), and the advanceable amount is increased. However, each time the employee 4 uses the card, the provider server 20 charges a fee from the charge on of the card (reduces the advanceable amount). Therefore, the user 4 cannot use all of the advance amount of the card charge (advanceable amount). Note that although that a fee is collected each time a card charge is made has been described, the number of times of collection may be limited. Specifically, for example, collection may only occur the first time after the payday (or closing date) has passed, or collection may occur only after three or more uses; depending on the number of uses, the amount to be collected may be changed (increase or decrease each time it is used).

Figure 15:
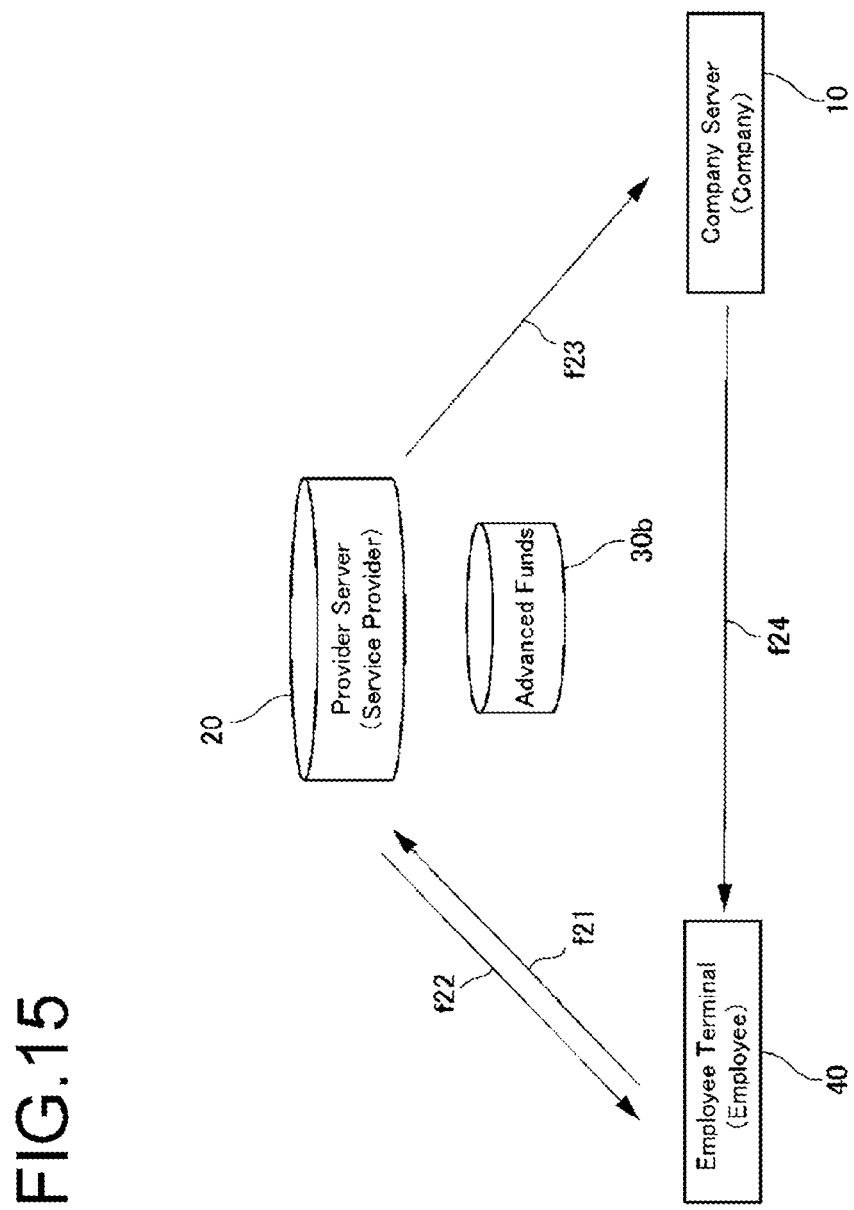
FIG. 15 is a system configuration diagram of a financial demand response provision service system.

Another method of fee collection processing for when an employee 4 uses the financial demand response provision service system will be described using FIG. 15.

When an employee 4 performs a procedure to receive a predetermined advance amount (prepayment application amount) using the employee terminal 40 (flow f21), the provider server 20 charges the amount obtained by subtracting the fee from the advance amount on the card (flow f22).

When the employee 4 uses the card, the card usage amount (purchase amount) is subtracted from the card balance (advanceable amount).

The provider server 20 totals the advance amount loaned to the employee 4 as of the closing date, and the service provider 2 bills the company 1 the amount of advance created based on the results of the advance charge usage by the employee 4 (flow f23).

The company 1 deducts the advance amount as of the employee's 4 closing date from the salary and pays the employee 4 (flow f24).

That is, when the employee 4 uses the financial demand response provision service system, the card is charged the advance amount minus the fee. (the full amount of the advance is not charged). Therefore, no fee will be collected from the card's charge (advanceable amount) each time the card is used.

Note that although that the amount of the advance was reduced by the fee was explained as being charged, the card should hold the amount of charge and the amount available, and the charge on the card may be increased by the full amount and the fee may be subtracted from the advanceable amount.

Figure 16:
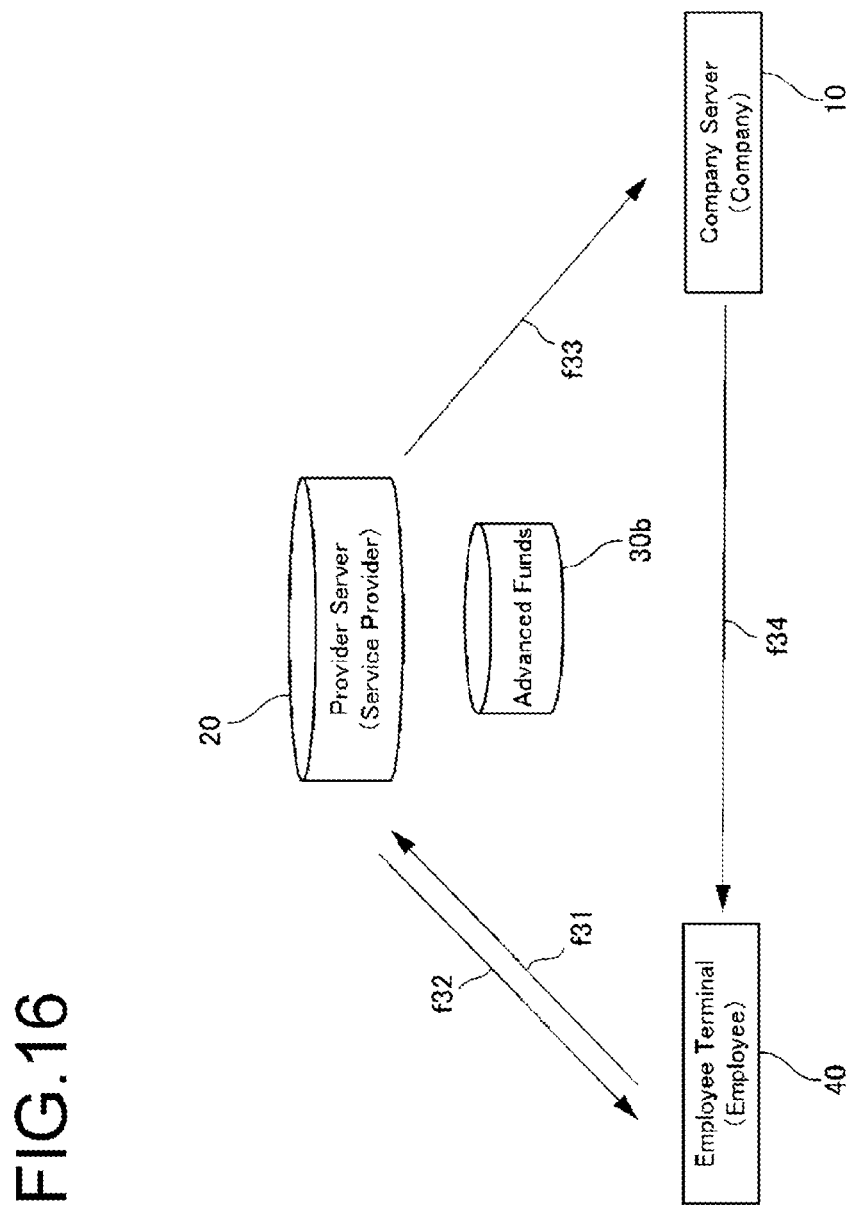
FIG. 16 is a system configuration diagram of a financial demand response provision service system.

Another method of fee collection processing for when an employee 4 uses the financial demand response provision service system will be described using FIG. 16.

When an employee 4 performs a procedure to receive a predetermined advance amount (prepayment application amount) using the employee terminal 40 (flow f31), the provider server 20 charges advance amount to the card (flow f32).

When the employee 4 uses the card, the card usage (purchase amount) is subtracted from the card's balance (advanceable amount).

The provider server 20 totals the advance amount loaned to the employee 4 as of the closing date; the service provider 2 bills the company 1 based on the advance amount created based on the actual advance use amount by the employee 4 as well as a usage fee for the employee's 4 use of the card (flow f33), and the company 1 pays the bill.

The company 1 then pays the employee 4 by deducting the advance amount as of the employee's salary closing date from the employee's salary 4 (flow f34).

That is, when the employee 4 uses the financial demand response provision service system, the provider server 20 charges the card the advance amount entered by the employee 4 (full charge for the input advance amount), and the advanceable amount is increased. On the other hand, when the employee 4 uses the card, the provider server 20 charges a fee to the company 1. Therefore, user 4 can use all of the advanceable amount.

Note that the fee charged to the company 1 may be calculated in accordance with the number of times the employee 4 uses the card, or a limit may be placed on the number of times billed.

Specifically, for example, it may be done only once or may be done a predetermined number of times, or the number of times of use after a predetermined number of times (for example, the third time) may be used; and depending on the number of times, the amount to be charged may be changed (increase or decrease for each use).

Figure 17:
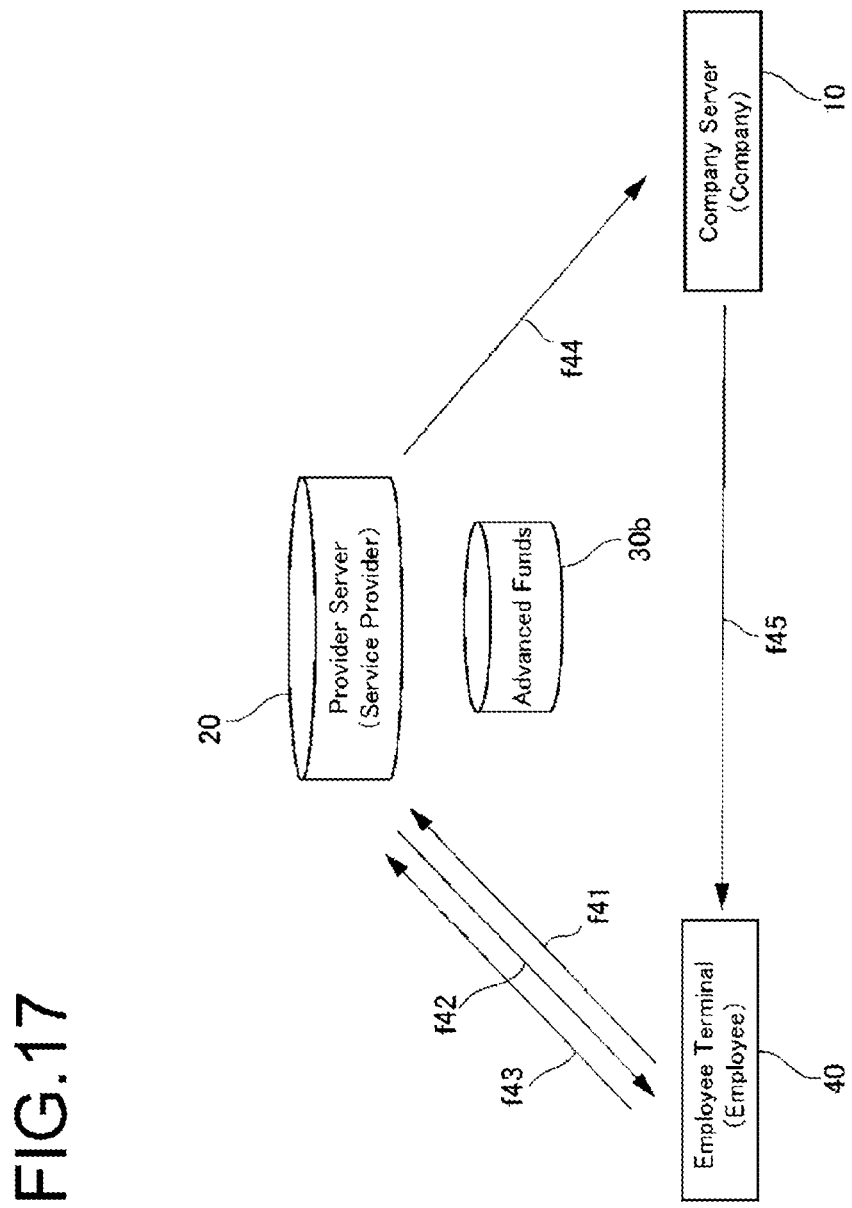
FIG. 17 is a system configuration diagram of a financial demand response provision service system.

Using FIG. 17, another method of fee collection processing for when an employee 4 uses the financial demand response provision service system will be described.

When an employee 4 performs a procedure to receive a predetermined advance amount (prepayment of salary) at the employee terminal 40 (flow f41), the provider server 20 transfers the electronic value information in a manner specified by the employee 4 (flow f42), and subtracts a fee from the advanceable amount (flow f43).

The provider server 20 totals the advance amount (electronic value information) loaned to the employee 4 as of the closing date, and the service provider 2 bills the company 1 based on the usage results by the employee 4 of the advance amount (electronic value information) (flow f44), and the company 1 pays on the bill.

The company 1 deducts from the employee's 4 salary the amount used based on the actual advance use amount as of the employee's salary closing date, and pays the employee 4 (flow f45).

That is, when the employee 4 uses the financial demand response provision service and receives a salary advance, a fee is collected; the remaining amount is transferred to the employee's managed account; the company 1 deducts the amount the employee 4 used from the salary based on the electronic value information, and pays the employee 4.

Note that the provider server 20 may charge a fee each time the employee 4 uses the financial demand response provision service may bill collectively at the closing date. Also, the number of times of use may be limited. Specifically, for example only the first time after the payday (or closing date) has passed may be billed, or you may request each time after three or more use may be billed, and depending on the number of times, the amount to be charged may be changed (increase or decrease for each use).

Figure 18:
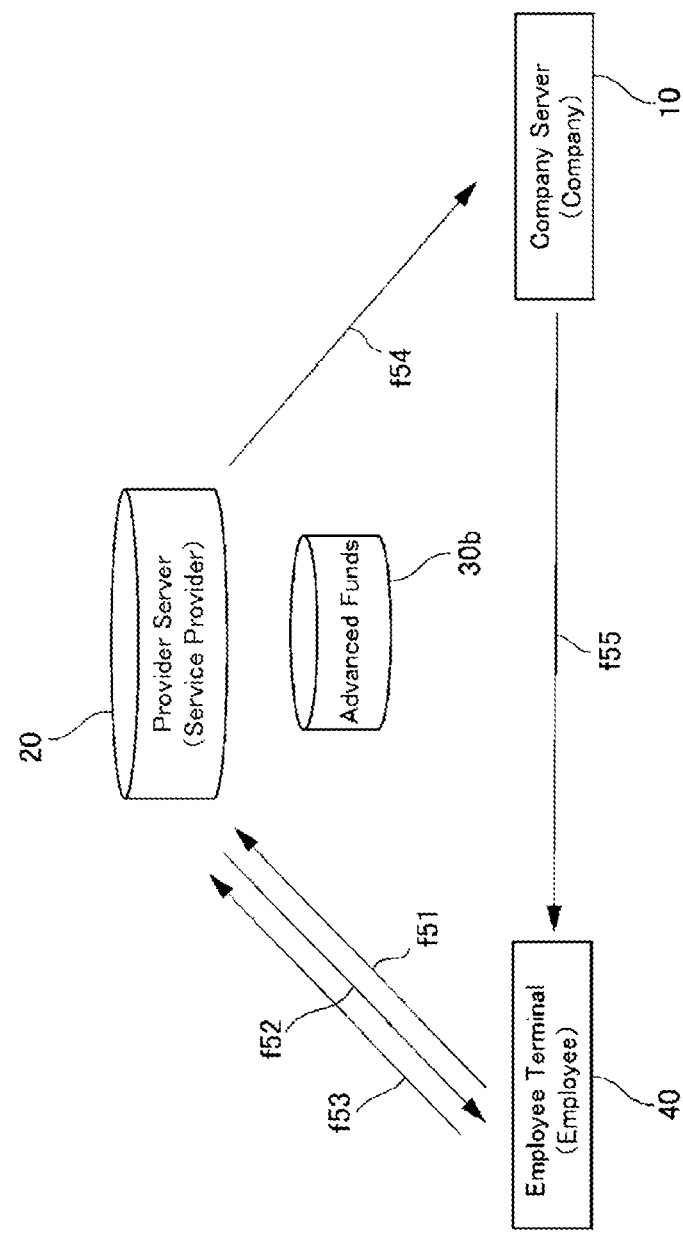
FIG. 18 is a system configuration diagram of a financial demand response provision service system.

Using FIG. 18, another method of fee collection processing for when an employee 4 uses the financial demand response provision service will be described.

When an employee 4 performs a procedure to receive a predetermined advance amount (prepayment of salary) at the employee terminal 40 (flow f51), the provider server 20 transfers the electronic value information in a manner that the employee 4 designates for the advance amount (flow f52).

When the employee 4 uses the financial demand response provision service system (flow f13), the amount used (purchase amount) is subtracted from the advanceable amount (electronic value information).

The provider server 20 totals the advance amount loaned to the employee 4 as of the closing date, and when the service provider 2 charges the advance amount to the company 1 based on the usage results by the employee 4 of the advance amount (electronic value information) and bills based on the fee associated with the use by the employee 4 of the electronic value information (flow f54), and the company 1 pays the bill.

The company 1 deducts the amount of the advance as of the closing date of employee's salary from the employee's 4 salary, and pays the employee 4 (flow f55).

That is, when the employee 4 uses the financial demand response provision service system, the provider server 20 adds the advance amount input by the employee 4 to the electronic value information corresponding to the advanceable amount (an increase of full amount to the pay advance entered). On the other hand, when the employee 4 uses the electronic value information, the provider server 20 charges a fee to the company 1. Therefore, the user 4 can use all of the advanceable amounts.

Note that the fee charged to the company 1 may be calculated in accordance with the number of times the employee 4 uses a card, or a limit may be placed on the number of times billed. Specifically, for example, it may be done only once or may be done a predetermined number of times, or the number of times of use after a predetermined number of times (for example, the third time) may be used; and depending on the number of times, the amount to be charged may be changed (increase or decrease for each use).

(Aggregation Period)

Figure 19:
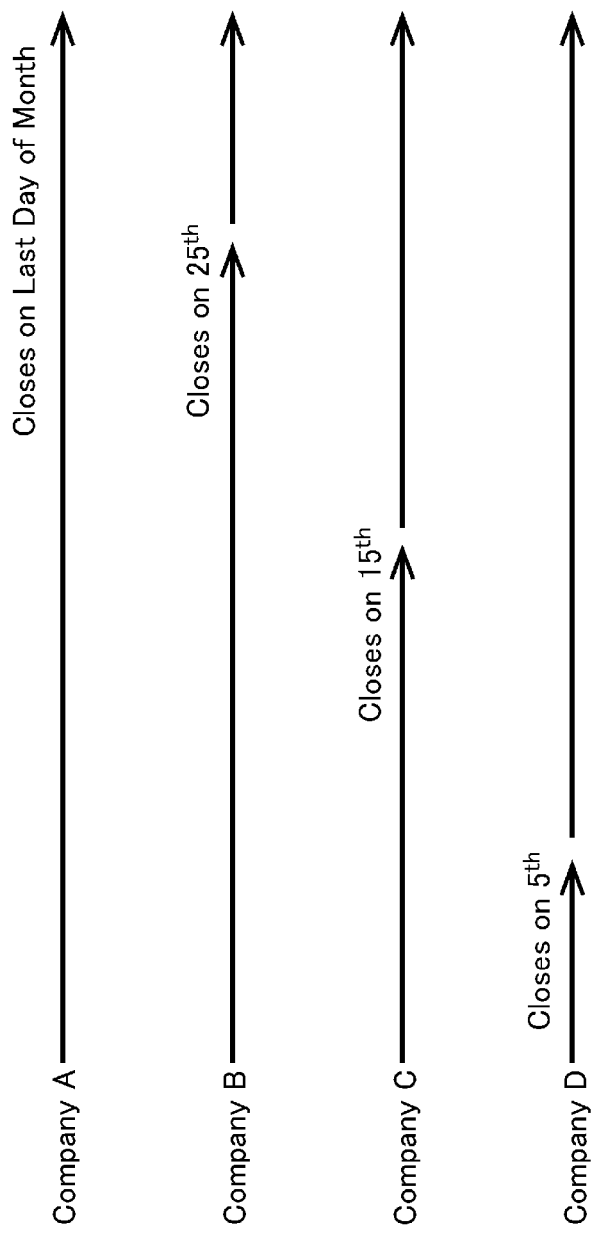
FIG. 19 is a diagram showing the relationship between closing dates of a financial demand response provision service system.

As shown in FIG. 19, payday is different for each company. Therefore, the aggregation period of the financial demand response provision service system may be set individually, and either a closing date (individual closing date) corresponding to each company may be set or one closing date (common closing date) may be set for all companies. In this case, after the elapse of each aggregation period, the service provider 2 bills each company after an arbitrary time.

The billing method for each company may be done, for example, by paper invoices, electronic billing, etc., but other methods may be used.

(Company Credit)

Figure 20:
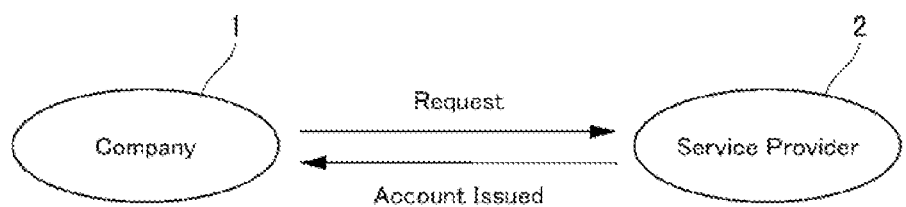
FIG. 20 is a conceptual diagram showing the relationship between a company and a service provider of the financial demand response provision service system.

As shown in FIG. 20, the service provider 2 may perform credit screening on a company 1.

When a company applies to use the financial demand response provision service system, the service provider 2 receives provisional information on the credit of the company, such as capital, the number of employees, asset information, or account settlement information of the company.

The service provider 2 either sets or does not set a usage limit for a company based on the credit information and issues an account.

The usage limits to be set include the range of the advanceable amount available throughout the company, the range of the advanceable amount available for each employee, and the range of the advanceable amount for labor wages, but are not limited to these.

In addition, the method for a company 1 to apply for and be issued an account may include, but is not limited to, in writing, via electronic mail, orally, or the like.

Figure 21:
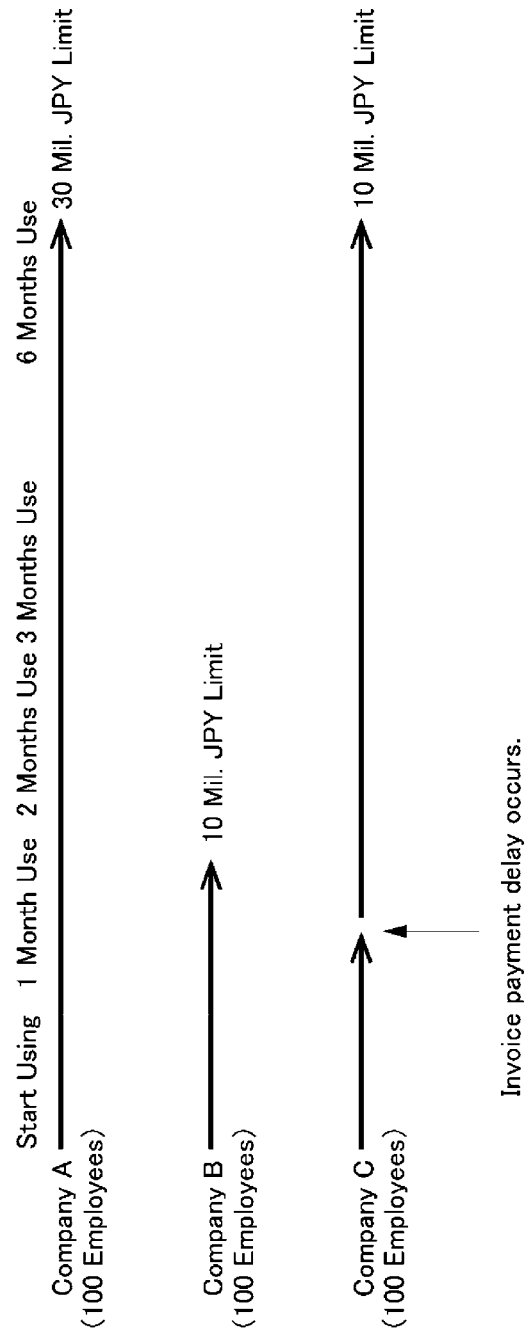
FIG. 21 is a diagram for explaining setting of a company limit amount of a financial demand response provision service system.

As shown in FIG. 21, the advanceable amount (limit amount) for a company may be changed based on the performance of the company. That is, the advanceable amount (limit amount) may be changed based on the payment performance of the company to the service provider 2.

For example, although Company A has only 100 employees, it has been using the financial demand response provision service system for a long period of six months, so the limit is set at 30 million yen. On the other hand, because Company B has only a short usage history of one month, the limit is set at 10 million yen.

Because Company C has a credit problem (the invoice payments have been delayed), while the usage history of the financial demand response provision service system has been as long as six months, the limit amount has been reduced to 10 million yen.

That is, the service provider 2 is able to arbitrarily set the usage limit of a company based on the usage record of the financial demand response provision service system, the credit of the company such as delayed payment, unpaid payment, and the like. Also, if there is a situation in which the credit is significantly lowered, such as when the unpaid credit continues, use of the financial demand response provision service system is preferably discontinued.

As shown in FIG. 22, the management screen for managing a plurality of companies displays company names a, the monthly usage/balance b, the number of consecutive months c, the number of employees d, the grade (credit rank) e etc. so that credit can be determined, and the grade (credit rank) e is able to be set based on the company name a, the monthly usage/balance b, the number of consecutive months c, and the number of employees d.

According to the financial demand response provision service system 100, if the selection information is selected to be performed automatically, at the time when the advanceable amount increased, an auto charge data output unit 223 that performs a transfer processing for electronic value information corresponding to a predetermined advanceable amount increase to the employee's managed account from the electronic value information of the advanceable amount for the employee; the auto charge data output unit 223 assumes that the predetermined advanceable amount increase is a fixed amount if the increase information indicates that the amount is fixed and that the fixed amount is lower than the increase of the advanceable amount, and if the increase is lower than the fixed amount, then because it is an increase, an advance (payroll prepayment) is able to be made within the salary advance range and can be used in real time without relying only on bank transfers on the employee side to realize the financial demand response provision service.

A company 1 does not need to prepare the advance because the service provider 2 performs the fund transfer. For this reason, a company 1 can use the financial demand response provision service system without bearing the burden of the advance.

Note that the advanceable amount is determined by the pay amount and the actual working hours defined in the employment conditions, and the daily work hours are automatically delivered in a CSV format from the attendance management data server 11 of the company 1 to which the employee 4 belongs, so that the burden on a company representative is greatly reduced. Note also that attendance management data such as daily working hours may be manually uploaded.

Further, according to the financial demand response provision service system 100 according to the present embodiment, if automatic charging of the advanceable amount ("Automatically" transferring electronic value information) is enabled, when actual working hours increases, an automatic charge can be done. Also, if automatic charging is enabled, charges that were not used by the pay close date will be reset, and the deducted amount paid to the employee as salary is only from the amount used. For this reason, the management load on the accounting person(s) at the company 1 and the employee 4 who is the user can be greatly reduced. In addition, when the automatic charge is disabled ("manually" transfers electronic value information of advance), an operation manually input by the employee 4 within the range of the advanceable amount is able to be charged, and in this case, manual charging becomes possible at the employee's 4 discretion which enhances usability because it can be used flexibly.

(Advance Financial Demand Response Provision Service Method)

In addition, according to the present embodiment, a financial demand response provision service method for providing a financial demand response provision service to employees belonging to company which has a company server that manages the actual advance amount of employees and the credit limit amount for employees, an attendance management data server which manages an employee's attendance management data, and a provider server that manages managed accounts of employees' electronic value information and are connected via a network, the provider server has a step of calculating an advanceable amount for an employee based on an credit limit amount managed by a company server and attendance management data managed by the attendance management data server, a step of transferring the electronic value information corresponding to the advance amount loaned to the employee within the range of the advanceable amount calculated from the electronic value information of the management account, a step of outputting the advance loaned to the employee to the company server, the company sever has a step of reflecting the advance from the provider server to the actual advance amount and calculating a credit limit amount corresponding to the actual advance amount.

According to the method of providing a financial demand response provision service according to the present embodiment, a business model can be realized in which a provider server 20 calculates an advanceable amount for an employee 4 based on attendance management data, and by executing a transfer process of electronic value information of the advance to the managed account 30a of an employee 4 which is within the range of the calculated advanceable amount, an employee 4 is able to use a advance in real time without relying only on a bank transfer.

Further, since the amount advanced from the provider server 20 is reflected in the actual advanced amount and the credit limit amount is calculated based on the actual advanced amount, a company is able to raise or lower the credit limit amount for an employee.

(Provider Server)

Also, for example, as shown in FIG. 4, the provider server 20 is connected via a network to an attendance management data server 11 which manages the time of an employee 4 of a company 1 and to an employee terminal 40 which is able to provide selection instructions for automatically or manually transferring electronic value information of the advance to the employee 4 from the company 1 and if the selection information provides instructions to be done automatically, able to send the increase information indicating that the increase of amount of the advance in the transfer process is fixed at a predetermined fixed amount or that the increase is done as a fluctuating increase based on a predetermined fluctuating rate.

The provider server 20 manages managed account(s) of employees and the advance from the company, and provides a financial demand response provision service for advance. In this embodiment according to the provider server 20 concerned, the provider server 20 reflects the advance amount on the actual advance amount, and because the credit limit amount is calculated based on the actual advance amount, a company is able to raise or lower the credit limit amount for an employee.

Also, for example, as shown in FIG. 3 a program according to the present embodiment is a program for a provider server that manages a financial demand response provision service for employees and managed accounts of employees' electronic value information which is connected via a network to a company server that manages an actual advance amount for employees belonging to a company and an credit limit amount for employees, and an attendance management data server that manages employee attendance management data. Then, for example, as shown in the flowchart of FIG. 7, the program is characterized in that it performs on a computer (provider server 20) a procedure for calculating an advanceable amount for an employee based on the credit limit amount managed by the company server and the attendance management data managed by the attendance management data server, a procedure for transferring electronic value information corresponding to an advance loaned to the employee within a range of a calculated advanceable amount from the electronic value information of managed account, and a procedure for outputting the advance amount loaned to the employee to the company server.

According to the program of the present embodiment, by having the provider server 20 sequentially reading and executing the stored programs according to the present embodiment which are stored in the program area of a storage unit 23, an employee 4 able to use an advance in real time without relying only on bank transfer.

Configuration of a Second Embodiment

The business model of a second embodiment is realized by an employing company 1, a service provider 2, a card company 3, employed employee(s) 4, and a bank 5. Then, the service provider 2 calculates an advanceable amount for an employee 4 based on the attendance management data of the employee 4 as transmitted from the company 1, and instructs the card company 3 to transfer electronic value information of an advance 30b which are within the range of a calculated advanceable amount in the managed account 30a of the employee 4. In response to this, the card company performs a transfer processing of the electronic value information of the advance 30b to the managed account 30a of the employee 4.

In order to be able to realize the above business model, company 1 is assumed to have signed an employment contract with employee 4, and the employee 4 is assumed to have applied for the financial demand response provision service with the service provider 2. In addition, the card company 3 is assumed to manage the employee 4's managed account 30a and the advanced 30b, and company 1 is assumed to have entered into a payroll transfer agreement with the bank 5 for the transfer of the salary to the bank account 50a after deducting the actual advance use amount. Note that here the card company 3 is assumed to be managing the managed account 30a and the advance 30b, but also the advance 30b are also assumed to be managed by the bank 5 (advance 50b). Also, after obtaining personal information permission for employee 4, the company 1 needs to have a contract for using this business model with the card company 3 or the bank 5 or the service provider 2 who procures the advanced.

The flow of data for realizing this business model is as follows.

Figure 23:
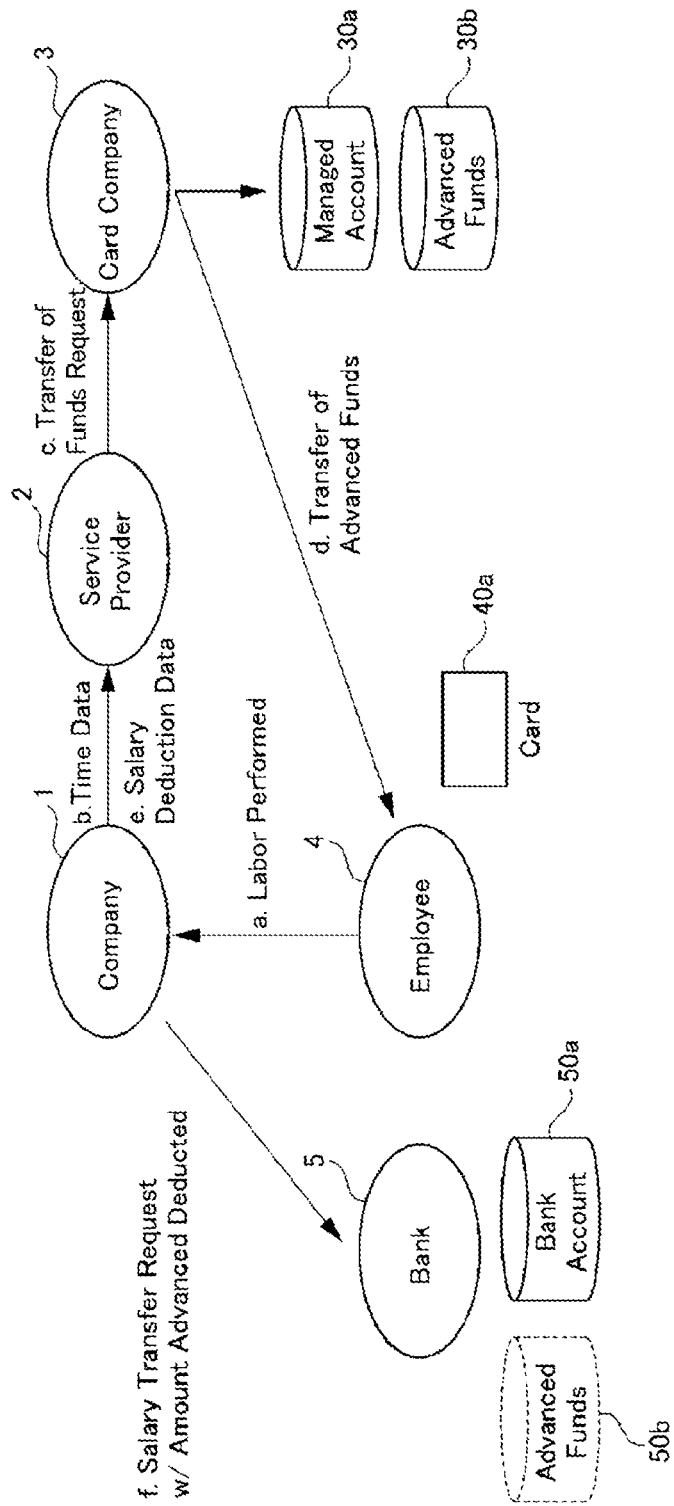
FIG. 23 is a diagram which is referred to in order to describe a business model for realizing a method of providing a financial demand response provision service.

As shown in FIG. 23, first, the employee 4 performs labor for the company 1 based on the employment contract (step a). Next, the company 1 transmits the attendance management data of the employee 4 to the service provider 2 that provides the financial demand response provision service (step b). Then, the service provider 2 calculates the advanceable amount for the employee 4 or the range based on the attendance management data, and at the time when the advanceable amount calculated here is increased (automatic charge to be described later) or at any time designated by the employee 4 (manual charge to be described later), apply to the card company 3 for a transfer of the advance to be loaned (step c). At this time, the card company 3 that has received the application performs a transfer of the electronic value information of the advance (hereinafter referred to as advance charge) to the managed account 30a managed by the card company 3 for the employee 4 (step d).

Note that the amount of the advance charge left unused is reset (subtracted) at the end of every month. Then, the company 1 acquires from the service provider 2 a payroll deduction amount created based on the usage results of the advance charge amount by the employee 4 (step e), requests the bank 5 to transfer to the bank account 50a of the employee the salary amount minus the advance amount used 4 (step f), and the bank 5 performs a transfer process based on the request.

Also note that the employee 4 may possess a card 40 which was manufactured by a printing company at the request of the card company 3 in order to use the advance. The cards 40a also include those issued by companies other than card companies. The card 40a may be a credit card, a debit card, a prepaid card or even perhaps electronic money. The card 40a is managed together with the managed account 30a assigned to the employee 4 belonging to the company 1, which is managed by the card company and the card 40a is linked by a uniquely assigned card number, an identification information or possibly a company code and an employee number. As a result, balance management is performed based on the advance usage results. Therefore, the balance charged to the managed account 30a and the card 40a needs to always be synchronized.

Note that the card 40a is not necessarily essential in realizing the business model, and identification information such as a uniquely assigned card number as the card 40a may be substituted.

Figure 24:
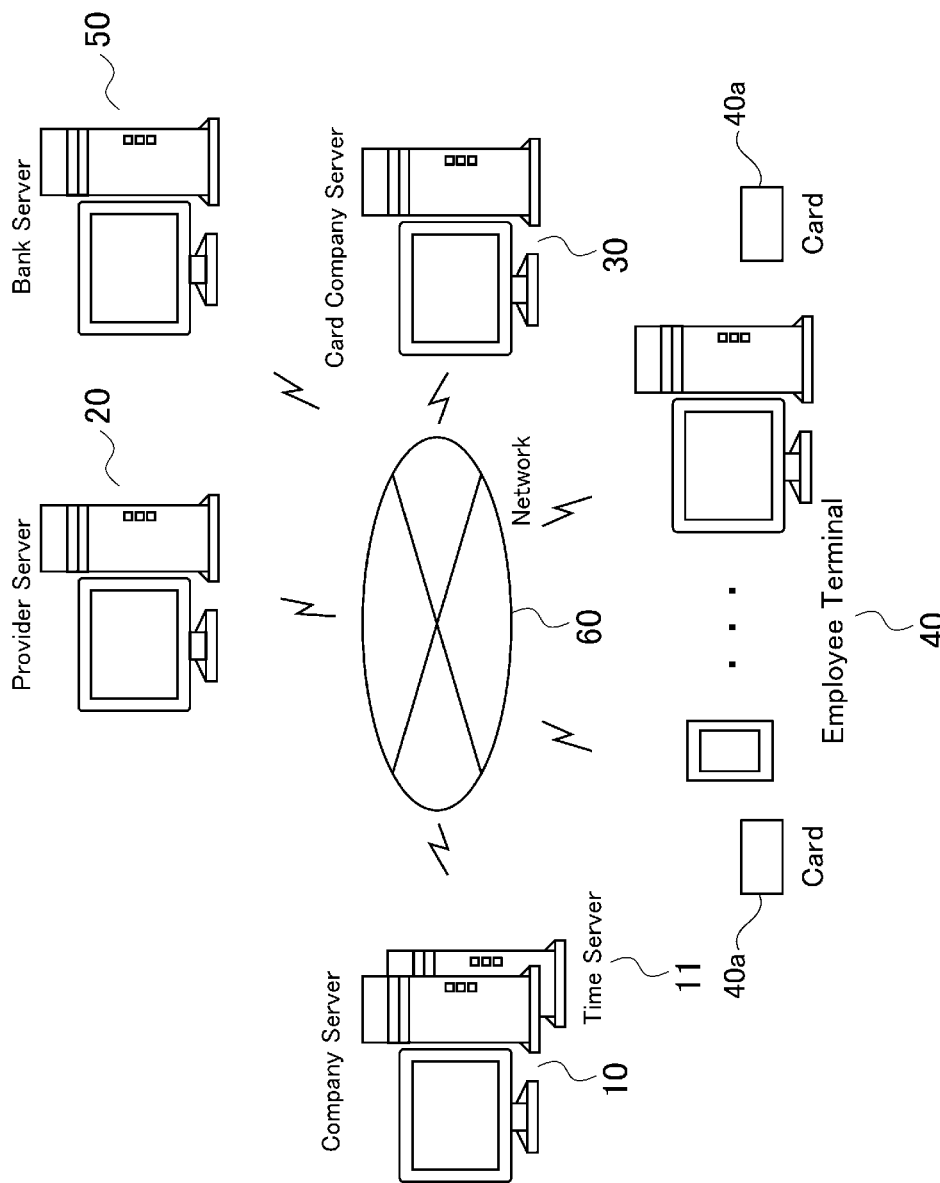
FIG. 24 is a system configuration diagram of a financial demand response provision service system.

As shown in FIG. 24, the financial demand response provision service system 100 according to the present embodiment involves connecting an attendance management data server 11 for managing the time of an employee 4 in the company 1, a card company server 30 for managing a managed account 30a of the employee 4 and an advance 30b for the employee 4, a provider server 20a for providing the financial demand response provision service for using the advance 30b, a bank server 50 that manages the bank account 50*a* of the employee 4, and an employee terminal 40 owned by the employee 4 which are connected via a network 60 such as an IP (Internet Protocol) network.

Note that for the company 1, the company server 10 is also set up to manage the employee data of employee 4 belonging to company 1 for payroll accounting processing, and similar to the attendance management data server 11 described above, is connected to the network 60. The case where the card company server 30 is installed at a place other than the card company is also included.

Note that the company server 10, the attendance management data server 11, the provider server 20*a*, the card company server 30, and the bank server 50 include the entire computer system managed and operated by the company 1, the service provider 2, the card company 3, and the bank 5, respectively. Further, the employee terminal 40 refers to a terminal such as a mobile phone, a smart phone, a PC (Personal Computer), etc. possessed by the employee 4 and having a connection with the network 60.

In the above-described system configuration, the provider server 20*a* calculates the advanceable amount for the employee 4 based on the attendance management data of the employee 4 transmitted from the attendance management data server 11, and transmits a message instructing the transfer of electronic value information of the advance to the managed account 30*a* (card 40*a*) of the employee 4 within the range of the calculated advanceable amount to the card company server 30. The card company server 30 transfers the electronic value information (advance charge) to the managed account 30*a* (card 40*a*) of the employee 4 due to receiving the message.

At the time when the attendance management data of employee 4 is received from attendance management data server 11, the provider server 20*a* calculates the advanceable amount based on the fixed salary per unit time under the terms of the employment contract (employment conditions) of the employee 4 and the actual working hours based on the attendance management data of the employee 4, and may send a message instructing the transfer of the electronic value information of the advance to the card company server 30. Note that when calculating the amount payable, if the salary per hour is not specified in the employment conditions, a pattern may be considered in which the amount of monthly salary divided by the day increases based on the time and date, or for example, a pattern in which up to 100,000 yen as a fixed amount can be used as the payable amount when working half of the month.

If the provider server 20*a* has received selection information beforehand from an employee terminal 40 instructing the transfer of electronic value information of the advance to be done automatically (automatic charge), the provider server 20*a* may automatically transmit a message instructing the transfer of the electronic value information of the advance to the card company server 30 at the time when the advanceable amount increases. On the other hand, if the provider server 20*a* has received selection message beforehand from the employee terminal 40 instructing a transfer of the electronic value information of the advance is to be done manually (manual charge), the provider server 20*a* may transmit a message instructing the transfer of the electronic value information of the advance to the card company server 30 at the time when an instruction for transfer is received from the employee terminal 40.

If automatic charge was selected, from the electronic value information of the transferred advance, the provider server 20*a* resets the amount of money not used at the end of the payroll day (the end of every month), and the amount used may be generated as salary deduction data. The company server 10 acquires the salary deduction data generated by the provider server 20*a* by downloading it, and performs a transfer process to the bank server 50 of the salary amount minus the advance to the bank account 50*a* of the employee 4.

Note that the financial demand response provision service system 100 according to the present embodiment is assumed to realize the above-described business model using the card settlement network of a card company 3 (not shown) which is different from the network 60 such as an IP network. For this reason, the employee 4 is able to shop at a member store and deposit/withdraw money from a partner ATM (Automatic Teller Machine) using the possessed card 40*a*. In addition, if the card 40*a* is a debit card to which a credit card number is provided, it can also be used for online shopping.

In recent years, in order to facilitate card payments, standardization of card terminals used for card payments has been implemented, for credit payments, standard specifications such as EMV (EuroPay International, MasterCard International and Visa International; registered trademark) and domestic applications are being used, and banks have established Federation Bankers' Association specifications. As an example of a standard specification, a general-purpose payment network system, such as CAFIS (Credit And Finance Information System: registered trademark), is widely used, in which card management companies for payment at the national level, distribution companies and third parties such as financial institutions (settlement companies), affiliated stores, etc. are connected online and payments are made using a card such as a credit card or a cash card.

Also, in order to differentiate from other companies, a payment network of brands can be established for each payment card operating company instead of a general-purpose payment network based on a strategy for collecting payment cards with a unique service by the payment card operating company. For example, JCN (Japan Card Network; Registered Trademark) in the case of JCB (JCB; Registered Trademark), VisaNet (VisaNet; Registered Trademark) in the case of VISA (Visa International; registered trademark), and these payment networks are used as payment networks to replace CAFIS.

Figure 25:
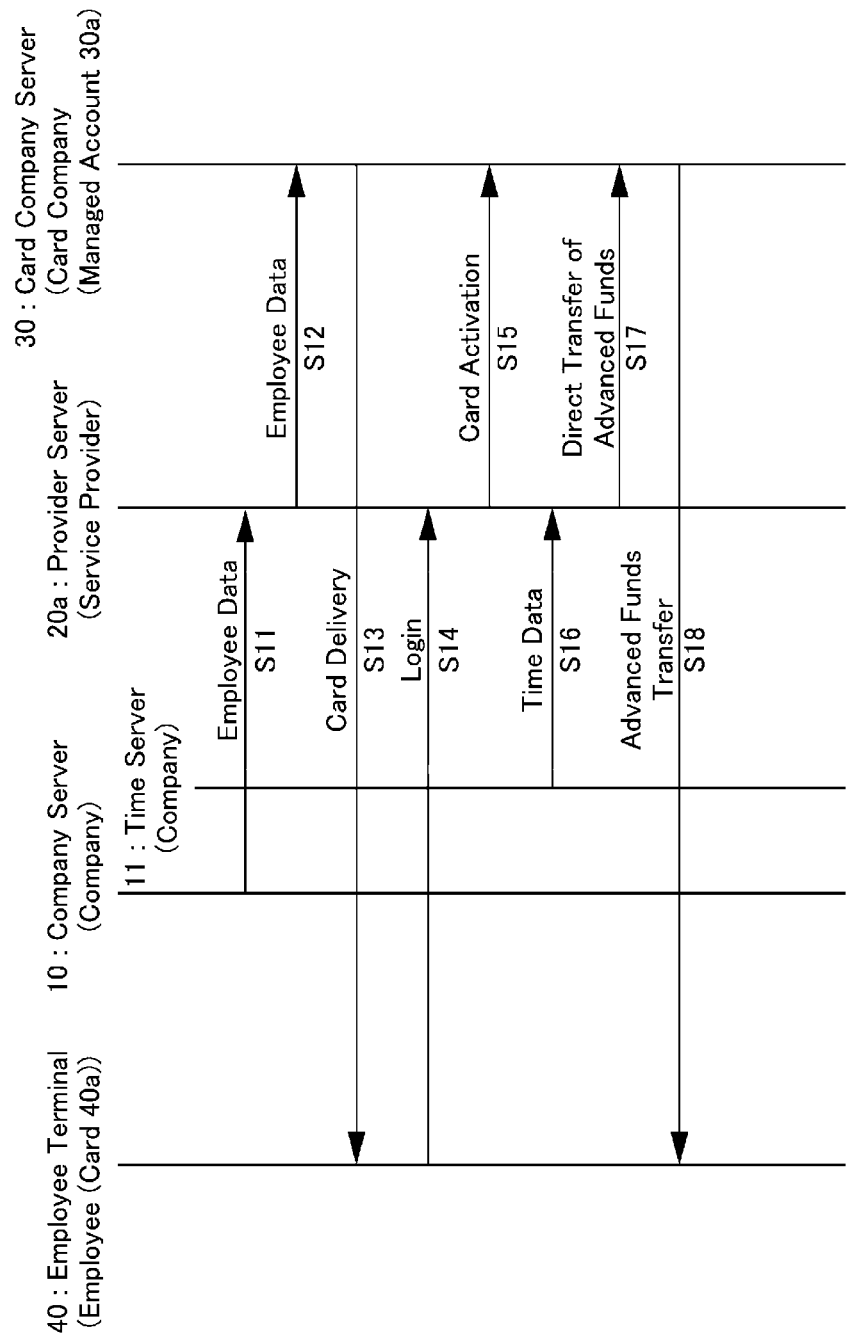
FIG. 25 is a sequence diagram of a financial demand response provision service system.

Hereinafter, the basic operation of the financial demand response provision service system 100 according to the present embodiment shown in FIG. 24 will be described with reference to FIG. 25. The provider server 20*a* and the card company server 30 correspond to the provider server 20 of the first embodiment.

When the attendance management data server 11 transmits the attendance management data of the employee 4 to the provider server 20*a* (step S11), the attendance management data is transferred to the card company server 30 (step S12). Note that the employee terminal 40 has already executed the processing for applying for the use of the financial demand response provision service system 100 that implements the business model by inputting the necessary items beforehand.

In response to this, Card Company 3 has the card 40*a* which was ordered to be manufactured by a printing company (not shown) delivered by mail or the like (step S13). Note that in the financial demand response provision service system 100 according to the present embodiment, the card 40*a* is not essential, and at a minimum, identification information such as a card number which can be managed by the card company server 30 and can be shared with employees is sufficient.

Next, the employee 4 operates the employee terminal 40 to login to the site (provider server 20*a*) of the service provider 2 based on the login information enclosed in the mailed card 40*a* (step S14). For the first login, the employee 4 operates the employee terminal 40 to input selection information instructing either the automatic transfer of the electronic value information of an advance (automatic charge) or a manual transfer (manual charge). By receiving this selection information, the provider server 20*a* performs a card activation processing for permitting the use of the card 40*a*, and the card company server 30 similarly performs an activation processing of the card 40*a* (step S15). Here, the validation process refers to a process of associating the managed account 30*a* with the card 40*a*.

After the above pre-processing, the provider server 20*a* calculates the advanceable amount for the employee 4 when the attendance management data of the employee 4 is transmitted from the attendance management data server 11 in, for example, CSV (Comma Separated Value) format (step S16), and a message instructing the transfer of the electronic value information of the advance (advance charge) which is within the range of the calculated advanceable amount to the managed account 30*a* of the employee 4 is sent to the card company server 30 (step S17).

Note that at the time when the provider server 20*a* has received the attendance management data from the attendance management data server 11, the provider server 20*a* calculates the advanceable amount based on the fixed salary per unit time under the terms in the employment conditions of the employee 4 and the actual working hours based on the attendance management data of the employee 4. For example, if 8 hours work has been done with the employment condition of 10,000 yen per hour, and the possible advance rate is set to 70%, the salary is 80000 yen and the advanceable amount is 56000 yen. When the card company server 30 receives a message instructing an advance charge from the provider server 20*a*, a transfer process of the electronic value information is performed on the managed account 30*a* of the employee 4, and an advance charge managed in association with the managed account 30*a* is performed on the card 40*a* possessed by the employee (step S18).

Note that the use of the advance charge advance amount is managed by the selection information input when the employee 4 logged in to the provider server 20*a* as in step S14. That is, if the provider server 20*a* has received beforehand from the employee terminal 40 selection information instructing the transfer of electronic value information of the advance to be done automatically (automatic charge), the provider server 20*a* automatically transmits a message instructing the transfer of the electronic value information of the advance to the card company server 30 at the time when the advanceable amount is increased by a predetermined amount. On the other hand, if the provider server 20*a* has received beforehand from the employee terminal 40 selection information instructing a transfer of the electronic value information of the advance to be done manually (manual charge), the provider 20*a* transmits a message instructing the transfer of the electronic value information of the advance to the card company server 30 at the time when an instruction for transfer is issued from the employee terminal 40.

Figure 26:
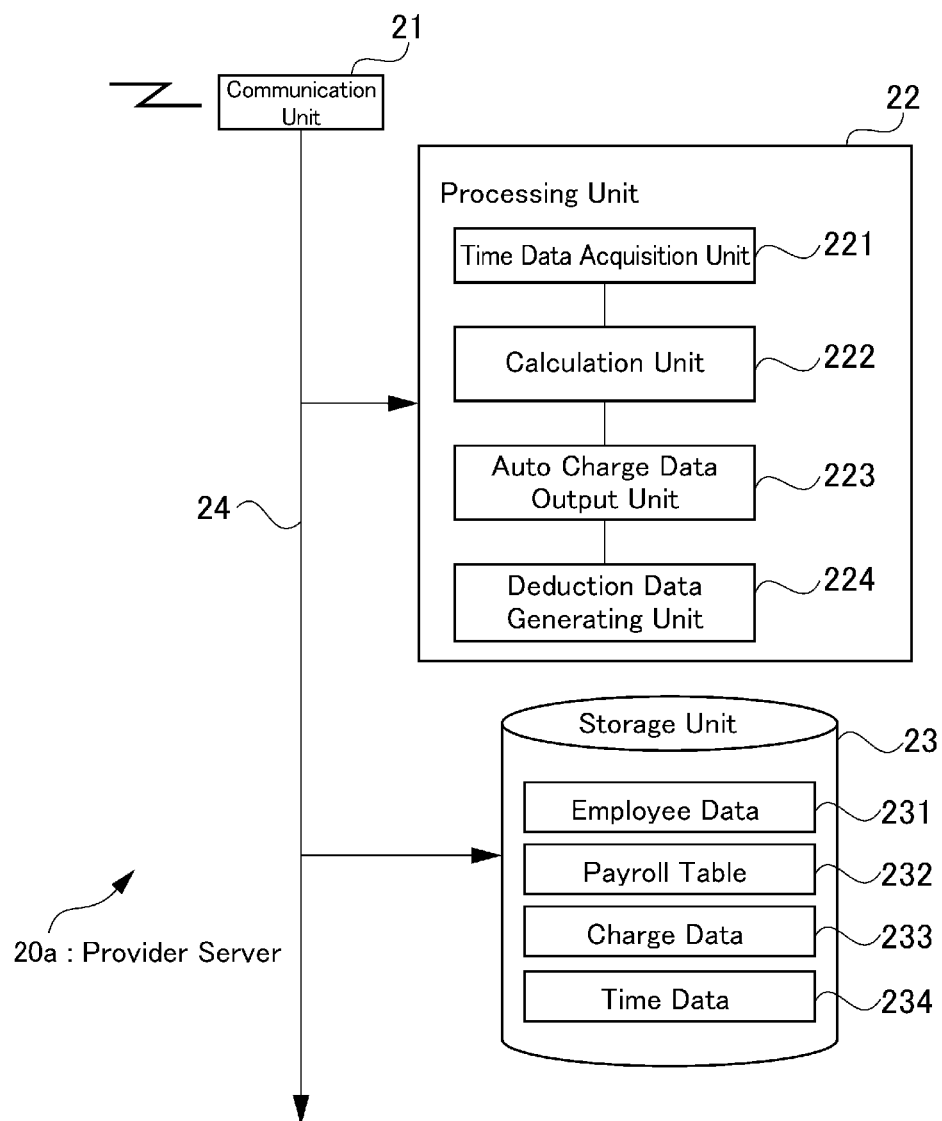
FIG. 26 is a block diagram showing a configuration of a provider server.

As shown in FIG. 26, in the provider server 20*a*, a communication unit 21, a processing unit 22, and a storage unit 23 are commonly connected via a bidirectional input/output bus 24 in which a plurality of lines for address, data, and control are configured.

The communication unit 21 is a communication LSI (Large Scale Integration) that carries a communication interface between the network 60 and the provider server 20*a* (processing unit 22), and for example, the file transfer linked by the API (Application Program Interface) is performed between the company server 10 connected to the network 60 and the card company server 30 by TCP/IP (Transmission Control Protocol/Internet Protocol).

The processing unit 22 calculates the advanceable amount for the employee 4 based on the attendance management data of the employee sent from the company server 10, and performs transfer processing to transfer to the card company server 30 the electronic value information of the advance to the managed account 30*a* for the employee 4 which is within the range of the calculated advanceable amount, and this is done in cooperation with the communication unit 21 and the storage unit 23.

In order for the processing unit 22 to calculate the advanceable amount for the employee 4 based on the attendance management data of employee 4 sent from attendance management data server 11 and execute a function as a processing means for transmitting a message instructing the transfer of electronic value information of the advance which is within the calculated advanceable amount range to the managed account 30*a* of the employee 4 to the card company server 30, an attendance management data acquisition unit 221, a calculation unit 222, an auto charge data output unit 223, and a deduction data generating unit 224 are provided as program execution means.

The attendance management data acquisition unit 221 acquires the attendance management data of a specific employee 4 from the attendance management data server 11 via the communication unit 21 in CSV format, and delivers the attendance management data to the calculation unit 222. At the time when the calculation unit 222 has received the time date, the calculation unit 222 calculates the advanceable amount based on the fixed salary per unit time under the terms in the employment conditions of the employee 4 and the actual working hours based on the attendance management data of the employee 4 and delivers it to the auto charge data output unit 223. The auto charge data output unit 223 transmits a message instructing the transfer of the electronic value information of the advance (advance charge) to the card company server 30 via the communication unit 21.

Note that if the calculation unit 222 has received selection information beforehand instructing that the electronic value information of the advance be automatically transferred (automatic charge) from the employee terminal 40, the calculation unit 222 also performs a processing to reset the electronic value information that has not been used as of the payroll date, furthermore, the deduction data generating unit 224 performs a calculation processing for generating the amount used by the employee 4 out of the advanced charged amount as salary deduction data.

If the auto charge data output unit 223 has received selection information from the employee terminal 40 beforehand that automatic charging is to be done, the auto charge data output unit 223 automatically transmits a message instructing the transfer of the electronic value information of the advance to the card company server 30 at the time when the advanceable amount increases. On the other hand, if the auto charge data output unit 223 has received selection information beforehand that manual charging is to be done, the auto charge data output unit 223 transmits a message instructing transfer of electronic value information of an advance to the card company server 30 at the time when an instruction for transfer is issued from the employee terminal 40.

The deduction data generating unit 224 generates, in CSV format, the amount used by the employee from the transferred electronic value information of the advance as salary deduction data. The company server 10 periodically or irregularly acquires salary deduction data (CSV) generated by the deduction data generating unit 224 from the provider server 20a, and requests to the bank server 50 performing a transfer processing of the salary amount minus the advance amount to the bank account 50a of the employee 4.

The storage unit 23 is mounted with, for example, a semiconductor storage element such as SRAM (Static Random Access Memory), DRAM (Dynamic Random Access Memory), flash RAM, or a large capacity storage element such as one with light or magnets, and in the embodiment described above in addition to the programs, the employee data 231, payroll table 232, auto charge data 233, charge data 233, and attendance management data 234 are also assigned and stored in the work area.

As shown in FIG. 27A, the employee data 231 has as data items at least a "company ID" which is uniquely assigned to each company 1 that has entered into a contract for using this business model, and in addition, has as data items a uniquely assigned "employee ID" for each employee 4 who applied for use of this business model beforehand, and a uniquely assigned "card ID" for each card 40a managed in association with a managed account 30a of an employee managed by the card company server 30.

As shown in FIG. 27B, the payroll table 232 is input and transferred by a company representative based on the employment contract, and has at least "company ID (identification)", "employee ID", "hourly/daily salary/monthly salary", and "salary amount" as data items. Further, as shown in FIG. 27C, the charge data (auto charge data) 233 is generated by the processing unit 22 (auto charge data output unit 223 or deduction data generating unit 224), has at least "card ID", "advance charge automatic (auto)/manual", and "charge amount (remaining amount)" as data items. Also, as shown in FIG. 27D, the attendance management data 234 is input and transferred by a company representative, and has at least "company ID", "employee ID", and at least one of "work days", "work hours" and "work month" are included as data items. That is, there are also cases where "company ID", "employee ID", and "working hours" are included as data items.

The employee data 231, the payroll table 232, the auto charge data 233, and the attendance management data 234 are all created in CSV format for transfer, and are linked by the company ID and the employee ID.

Operation of the Embodiments

Figure 28A:
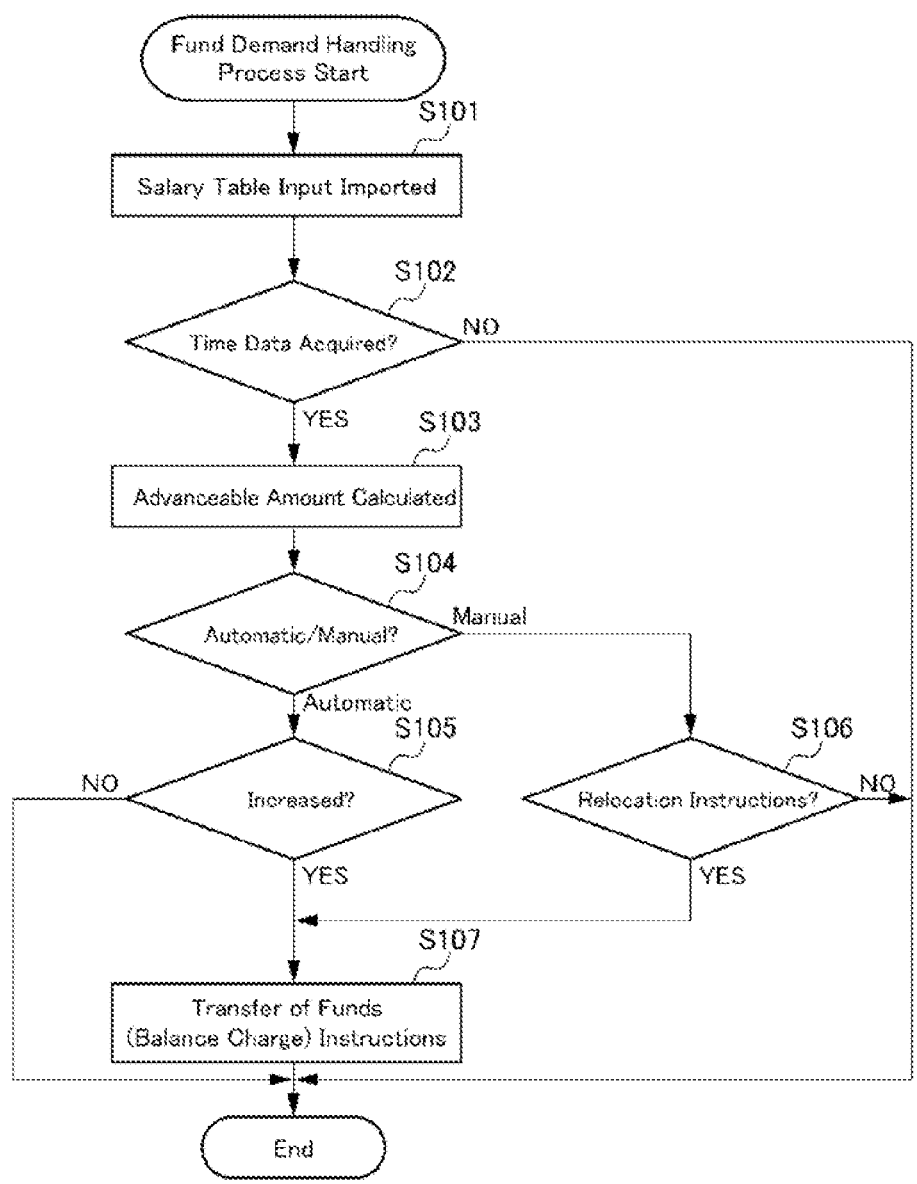
FIGS. 28A and 28B are flowcharts showing the processing operation of the provider server.
Figure 28B:
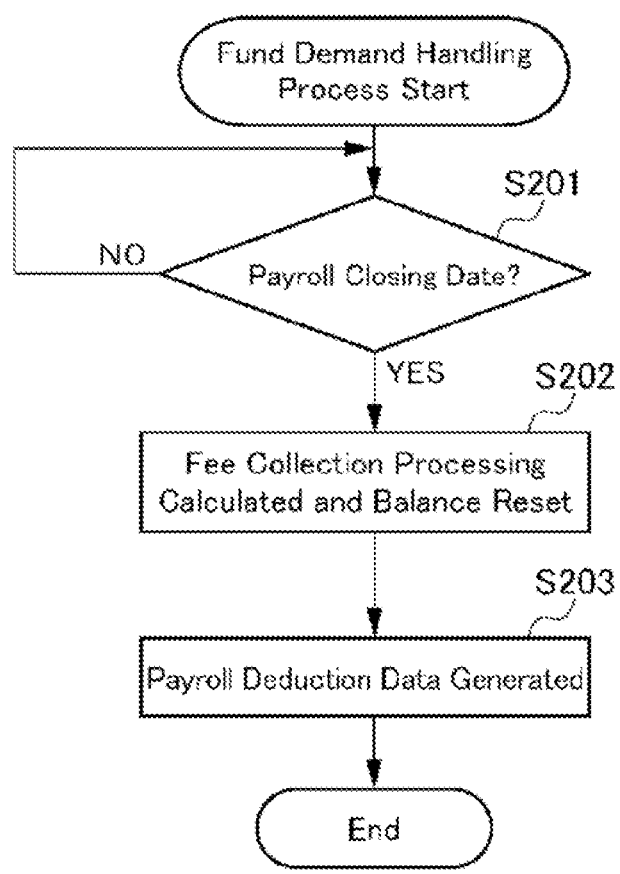

Hereinafter, the fund demand handling process of the provider server 20a shown in FIG. 26 and FIGS. 27A, 27B, 27C and 27D, and the financial demand response tabulation process will be described in detail with reference to the flowcharts shown in FIGS. 28A and 28B.

The financial demand handling process will be described. In FIG. 28A, in the provider server 20a, first, the processing unit 22 performs input and import of a payroll table in CSV format generated by the company server 10 (step S101). Next, when the attendance management data acquisition unit 221 fetches the attendance management data 234 from the attendance management data server 11 via the communication unit 21 in CSV format by file transfer (step S102 "YES"), the calculation unit 222 calculates the advanceable amount (step S103). Referencing the storage unit 23 at the time when attendance management data 234 is received from the attendance management data server 11, the calculation of the advanceable amount is calculated based on the pay per unit time (hourly pay/daily pay) stored in the payroll table 232 and the working hours based on the attendance management data 234 of the employee 4, and the calculated advanceable amount is delivered to the auto charge data output unit 223.

At this time, if auto charge data output unit 223 has received beforehand from the employee terminal 40 selection information instructing that the transfer of electronic value information of the advance is to be done "automatically (automatic charge)" (step S104 "automatic"), the auto charge data output unit 223 generates the auto charge data 233 at the time when the advanceable amount has increased (step S105 "YES"), and while being stored in a predetermined area (auto charge data 233) of the storage unit 23, transmits a message instructing the transfer of the electronic value information of the advance (advance charge) to the card company server 30 via the communication unit 21 (step S107). When the card company server 30 receives the message of the advance charge, the card company server 30 performs the transfer processing of the electronic value information to the managed account 30a of the employee 4 managed by the card company.

On the other hand, if the auto charge data output unit 223 has received beforehand from the employee terminal 40 selection information instructing that the transfer of the electronic value information of an advance is to be done "manually (manual charge)" (step S104 "manual"), at the time when there is a transfer instruction from the employee terminal 40 (step S106 "YES"), a message instructing transfer of the electronic value information of the advance is transmitted to the card company server 30 via the communication unit 21 (step S107). Also in this case, when the card company server 30 receives the message of advance charge, the card company server 30 performs the transfer processing of the electronic value information to the managed account 30a of the employee 4 managed by the card company.

Next, the money demand response tabulation process will be described. In FIG. 28B, when the salary closing date is reached (step S201 "YES"), then the provider server 20a (calculation unit 222) performs the calculation of a fee collection process and a process of resetting the transferred electronic value information of the advance, which has not been used as of the payroll closing date (step S202). Subsequently, the deduction data generating unit 224 generates the amount used by the employee 4 as obtained from the calculation unit 222 as salary deduction data (step S203). Then, the company server 10 acquires the deduction data from the provider server 20a (deduction data generating unit 224) at the end of the month and requests the bank server 50 to execute a transfer processing of a salary amount minus the advance used to the bank account 50a of the employee 4.

Figure 29:
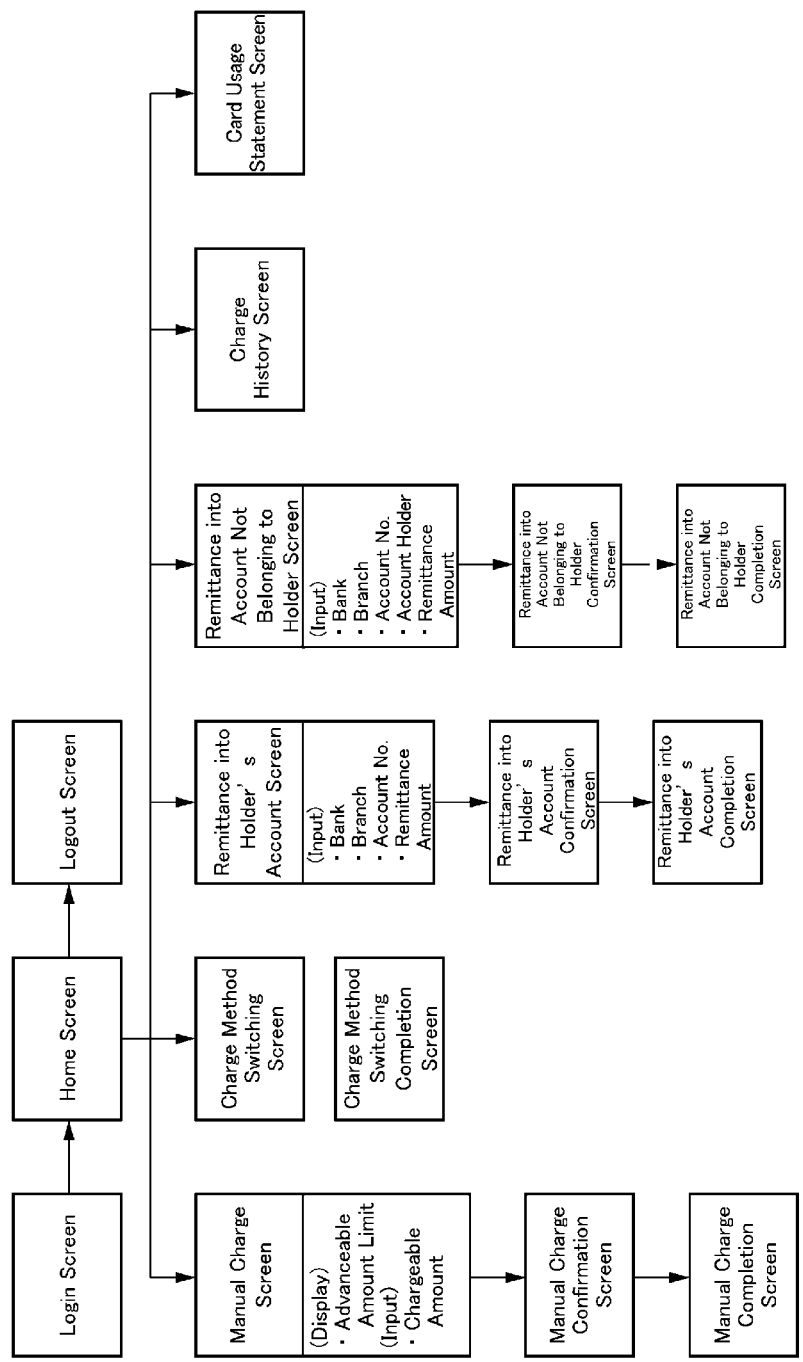
FIG. 29 is a screen transition diagram of the employee terminal.
Figure 30A:
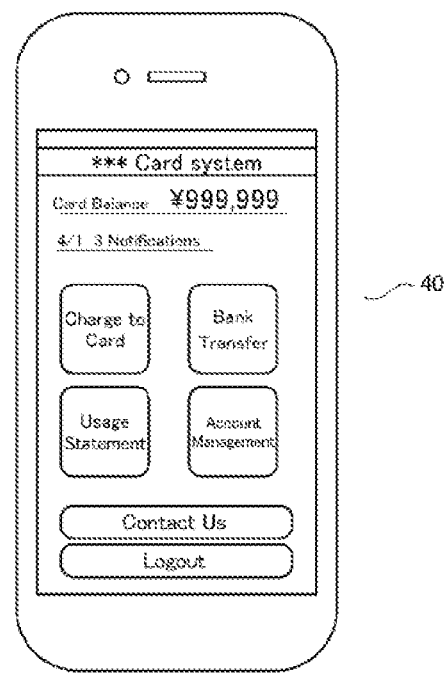
FIGS. 30A and 30B are diagrams showing an example of a screen configuration of a home screen and a charge switching screen.
Figure 30B:
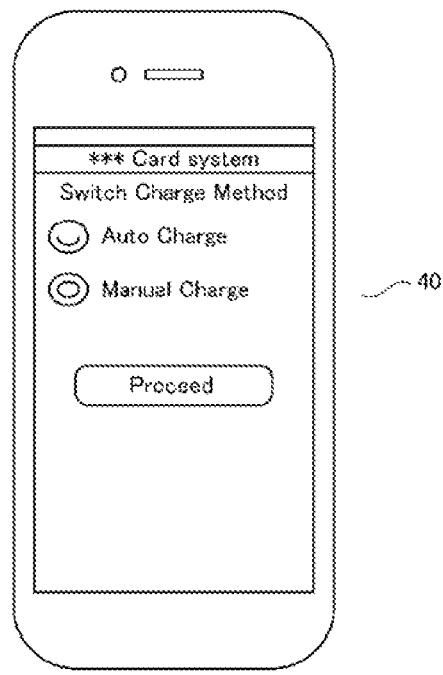

FIG. 29 shows a screen transition diagram of the employee terminal 40, and FIGS. 30A and 30B shows an example of the screen configuration of the home screen and the switch charge method screen.

As shown in FIG. 29, on the LCD (Liquid Crystal Display) monitor of the employee terminal 40, a login screen, a home screen, or a logout screen is displayed. From FIG. 30A which shows an example of the configuration of a "home screen" transitions to the "charge method switching screen", and example of which is in FIG. 30B, the remittance screen to the principal account (bank account 50a), the remittance request screen to an account other than the person (bank account 50a), or the card usage statement screen are possible.

As shown in FIG. 30A, on the "home screen", in addition to the card balance, buttons for charging a card, bank remittance, usage details, and account management are allocated, and when the employee 4 selects (taps) one of these buttons services corresponding to charging the card 40a, remittance to a bank, browsing usage details, or account management are executed. These services (applications) executed by choosing any button will be described later.

Also, as shown in FIG. 30B, on the "charge method switching screen", check buttons for switching between automatic and manual are assigned. After the employee 4 operates the employee terminals 40 to activate it and presses the proceed button at the first login, switching between "automatic charge" for automatically sending a message instructing the transfer of the electronic value information of the advance at the time when the advanceable amount increases, and "manual charge" for transmitting a message instructing transfer of the advance electronic value information at the time when the employee 4 provides instructions becomes possible. Here, if one of them is being selected, the "charging method switching completion screen" is displayed (see FIG. 29).

In FIG. 29, when "manual charge screen" is selected, the advanceable amount is displayed on the LCD monitor of the employee terminal 40, and when the employee enters the amount to be charged, the screen transitions to the "manual charge confirmation screen". Then, under the confirmation of the employee 4 (a tap of the OK button, not shown), the "manual charge completion screen" is displayed. In addition, if "remittance to personal account screen" is selected, then the employee 4 is required to input the name of the bank and the branch, the account number, and the remittance amount by means of the employee terminal 40. If these required items are entered, the screen will transition to the "remittance to personal account confirmation screen", and then transit to the "remittance to personal account completion screen" after confirmation by the employee 4. Note that in case the account information has been input beforehand at the time of employee registration, if the account is selected, the screen will transition to the "remittance to personal account confirmation screen", and then to the "remittance to personal account completion screen" after confirmation by the employee 4.

Note that even when "remittance to account other than the person screen" is selected, the employee 4 similarly is required to input the name of the bank and the branch, the account number, and the remittance amount by means of the employee terminal 40. After entering these required items, the screen will transition to "remittance to account other than the person confirmation screen," and then transition to "remittance to account other than the person completion screen" under confirmation of the employee 4. These screen transitions are realized by the GUI (Graphical User Interface) of the employee terminal 40 which is under the control of the provider server 20a (processing unit 22).

Figure 31:
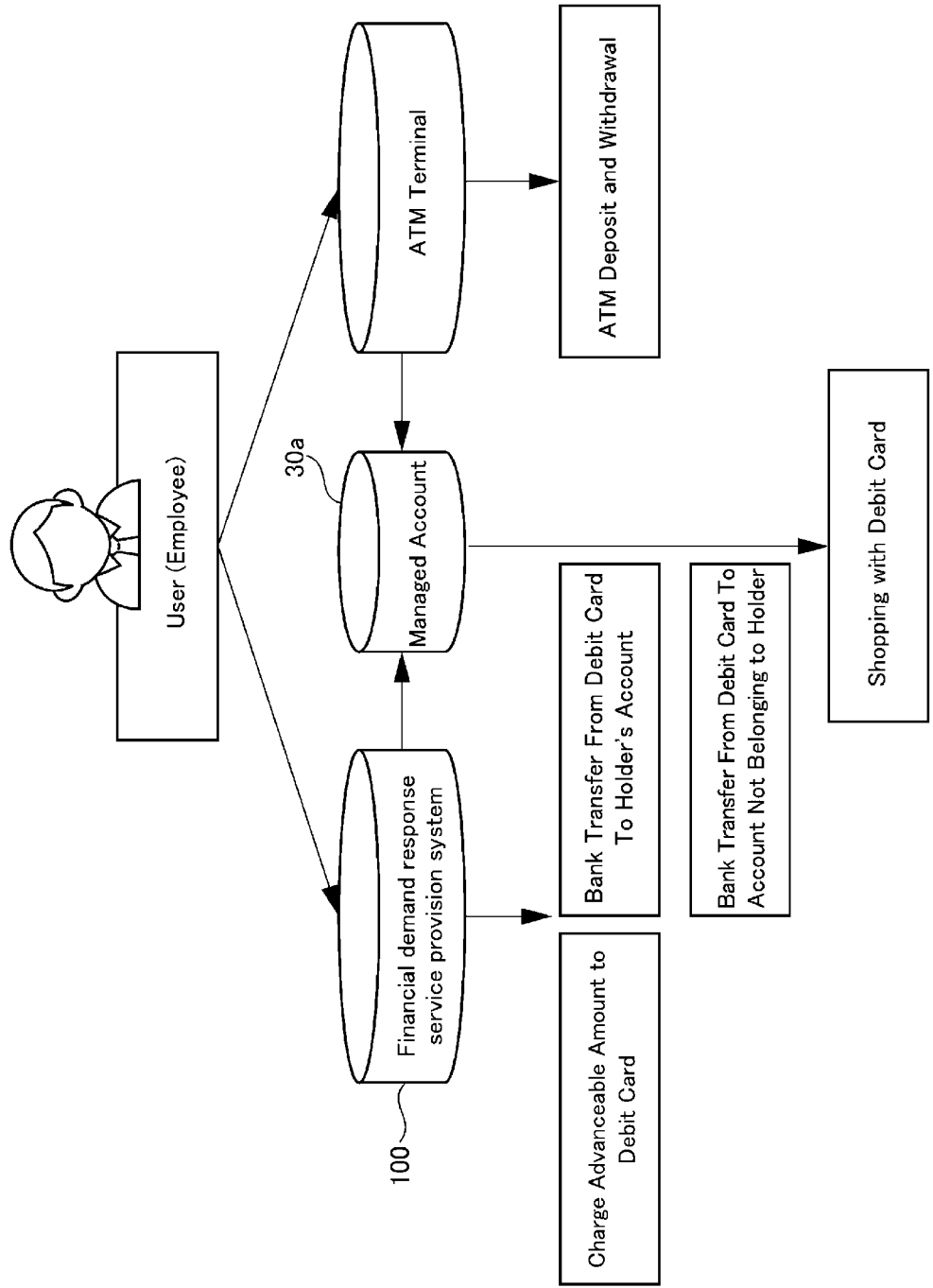
FIG. 31 is a diagram cited to explain an application that can be used by an employee in a financial demand response provision service system.

FIG. 31 shows an example of services (application) available to the employee 4.

As shown in FIG. 31, according to the financial demand response provision service system 100 according to the present embodiment, with the managed account 30a of the employee managed by the card company 3, that advanceable amount can be charged to the card 40a, and transferring money from the card 40a to a bank account in the name of the person, to a bank account in the name of another person, or the like is possible. In addition, cash payments and withdrawals at an ATM as well as shopping with the card 40a are also possible, and if the card 40a has a credit card number provided, online shopping can also be done. Note that the card 40a is not limited to a prepaid card, and can be replaced by a credit card, electronic money as a form of conveyance, or the like.

Effect of the Embodiment

According to the financial demand response provision service system 100 according to the present embodiment, payment can be made from the advanceable amount by a card 40a such as a prepaid card, credit card, electronic money, etc. which is linked to the managed account 30a of the employee 4 managed by the card company 3, and in executing this business model, the employee 4 who is the worker can use it in real time without relying only on a bank transfer. In addition, the card 40a is not essential, and the employee 4 is able to realize the same thing only with a card number.

Note that the advanceable amount is determined by the amount of pay and the actual working hours defined in the employment conditions, and the daily work hours are automatically delivered in CSV format from the attendance management data server 11 of the company 1 to which the employee 4 belongs, so that the burden on the company representative is greatly reduced. Also note that attendance management data such as daily working hours may be manually uploaded.

Further, according to the financial demand response provision service system 100 according to the present embodiment, if automatic charge for the advanceable amount ("automatically" transfers electronic value information) is enabled, the card 40a can be charged automatically when the actual working hours increases. Also, if automatic charging is enabled, charges that were not used as of the pay close date will be reset, and the amount deducted from the amount used is paid to the employee as salary. For this reason, the management load on an accounting person in the company 1 and on the employee 4 who is the user can be greatly reduced. In addition, if the automatic charge is disabled ("manually" transfers the electronic value information of the advance), the card 40a can be manually charged by the input from the employee 4 within the range of the advanceable amount, and In this case, manual charging can be performed at the discretion of the employee 4 allowing for flexibility which increases usability.

(Financial Demand Response Provision Service Loan Method)

The financial demand response provision service method according to the present embodiment is a financial demand response provision service method for providing a financial demand response provision service for an employee 4 belonging to a company 1 using a card company server 30 payment network. Then, for example, as shown in FIG. 25, the attendance management data server 11 connected via the network 60 transmits the attendance management data of the employee 4 to the provider server 20a (S11); the provider server 20a calculates an advanceable amount for the employee 4 based on the attendance management data, and sends to the card company server 30 a message instructing transfer of the electronic value information of the advance within the calculated range of advanceable amount to the managed account 30a of the employee 4 managed by the card company 3 (S16, S17); and when the card company server 30 receives the message from the provider server 20a, a process of transferring the electronic value information to the managed account 30*a* of the employee is executed (S18).

According to the financial demand response provision service method according to the present embodiment, a business model can be realized by the provider server 20*a* calculating the advanceable amount for the employee 4 based on the attendance management data and sending a message instructing transfer of the electronic value information of an advance to the managed account 30*a* of the employee 4 managed by the card company 3 which is within the range of the advanceable amount calculated for the card company server 30, and the card company server 30 executing a transfer processing of the electronic value information to the managed account 30*a* so that the employee 4 can use an advance in real time without relying only on a bank transfer.

(Provider Server)

Also, as shown in FIG. 24, for example, the provider server 20*a* according to the present embodiment is a provider server connected via a network to an attendance management data server 11 for managing the time of an employee 4 belonging to a company 1, and a card company server 30, which manages a managed account 30*a* of the employee 4 and provide an advance for the employee 4 to provide a financial demand response provision service for using the advance. Then, for example as shown in FIG. 26, the provider server 20*a* has a processing means (processing unit 22) for transmitting to the card company server 30 a message instructing transfer of electronic value information of the advance to the management account 30*a* of the employee 4 within the range of the calculated advanceable amount based on the attendance management data of employee 4, calculate the possible loan amount for employee 4.

According to the provider server 20*a* of the embodiments, a provider server 20*a* can be provided in which a processing unit 22 calculates the advanceable amount for the employee 4 based on the attendance management data of the employee 4 and instructs the card company server 30 to transfer the electronic value information of the advance which is within the calculated range of advanceable amount to the managed account 30*a* of the employee 4, so that the employee 4 is able to use the advance in real time without relying only on a bank transfer.

Also, a program according to the present embodiment is, for example, as shown in FIG. 24 a program of the provider server 20*a* connected via the network 60 to an attendance management data server 11 for managing the time of an employee 4 belonging to a company 1 and to a card company server 30, which manages a managed account 30*a* of the employee 4 and the advance to the employee 4 so as to provide a financial demand response provision service for using the advance. Then, the program is characterized in that, for example, as shown in the flowchart of FIG. 28 (*a*), the program performs a procedure which calculates the advanceable amount for employee 4 based on the attendance management data of employee 4 sent from attendance management data server 11 to the computer (provider server 20*a*) (S103), and a procedure which sends a message to the card company server 30 instructing the transfer of the electronic value information of the advance that is within the calculated range of advanceable amount to the managed account 30*a* of the employee 4 (S104 to S107).

According to the program of the present embodiment, by sequentially reading out and executing the program according to the present embodiment which is stored in the program area of the storage unit 23 by the provider server 20*a*, an employee 4 can use an advance in real time without relying on only a bank transfer.

Although the present invention has been described above using the embodiments, it goes without saying that the technical scope of the present invention is not limited to the scope described in the above embodiments. Various changes or modifications that are apparent to those skilled in the art can be added to the above embodiments. In addition, it is also apparent from the scope of the claims that embodiments which add such changes or improvements can also be included in the technical scope of the present invention.

The invention described in the following attached claims were initially attached to the request for the prior-priority application. The item numbers of the claims described in the appendices are as in the claims attached first to the request for the application prior to the right of priority.

The invention claimed is:

1. A financial demand response provision service system for providing financial demand response services to one or more employees belonging to a company comprising:
   a company server that stores credit limit amount data for each of the one or more employees,
   a time server that stores time data of each of the one or more employees,
   a provider server that has one or more managed accounts each to store electronic value information of funds available as an advance to a corresponding one of the one or more employees, wherein the one or more managed accounts are funded by a provider that temporarily provides the one or more employees with an advance on behalf of the company, and
   an electronic money server that stores electronic money of each of the one or more employees;
   wherein the servers are connected via a network, and
   wherein the provider server comprises a processor configured to:
      calculate an advanceable amount for an individual employee based on the credit limit amount data received from the company server and the time data received from the time server, and manage the electronic value information in an individual managed account based on the advanceable amount,
      charge to the electronic money of the individual employee with the electronic value information in the individual managed account, and
      output, to the company server, an individual advance amount loaned or lent to the individual employee by charging the electronic money with the electronic value information,
   wherein the processor is further configured to set the advanceable amount such that a total advanceable amount to the one or more employees of a same company does not exceed a total advanceable amount range for the company set by the provider.

2. A financial demand response provision service system for providing financial demand response services to one or more employees belonging to a company comprising:
   a company server that stores credit limit amount data for each of the one or more employees,
   a time server that stores time data of each of the one or more employees,
   a provider server that has one or more managed accounts each to store electronic value information of funds available as an advance to a corresponding one of the one or more employees, wherein the one or more managed accounts are funded by a provider that temporarily provides the one or more employees with an advance on behalf of the company, and a virtual currency server that has virtual currency accounts of the one or more employees;

wherein the servers are connected via a network, and wherein the provider server comprises a processor configured to:

calculate an individual advance able amount for an individual employee based on the credit limit amount data received from the company server and the time data received from the time server, and manage the electronic value information in an individual managed account based on the individual advanceable amount, transfer the electronic value information from the individual managed account to a virtual currency account of the individual employee, and output, to the company server, an individual advance amount loaned or lent to the individual employee by transferring the electronic value information from the individual managed account to the virtual currency account, wherein the processor is further configured to set the individual advanceable amount such that a total advanceable amount to the one or more employees of a same company does not exceed a total advanceable amount range for the company set by the provider.

3. A method for providing financial demand response services to one or more employees belonging to a company in a system including a company server that stores credit limit amount data for each of the one or more employees, a time server that stores time data of each of the one or more employees, a provider server that has one or more managed accounts each to store electronic value information of funds available as an advance to a corresponding one of the one or more employees, wherein the one or more managed accounts are funded by a provider that temporarily provides the one or more employees with an advance on behalf of the company, and a bank server that has one or more bank accounts to which one or more salaries of the one or more employees are transferred from the company, wherein the servers are connected via a network, the method comprising:

in the provider server conducting the steps of:

calculating an individual advanceable amount for an individual employee based on the credit limit amount data and the time data, and managing the electronic value information in an individual managed account based on the individual advanceable amount, transferring the electronic value information from the individual managed accounts to a bank account of the individual employee, and outputting to the company server an individual advance amount loaned or lent to the individual employee by transferring the electronic value information from the individual managed account to the bank account, wherein the individual advanceable amount is set such that a total advanceable amount to the one or more employees of a same company does not exceed a total advanceable amount range for the company set by the provider.

4. A computer program product for providing financial demand response services to one or more employees belonging to a company in a system including a company server that stores credit limit amount data for each of the one or more employees, a time server that stores time data of each of the one or more employees, a provider server that has one or more managed accounts each to store electronic value information of funds available as an advance to a corresponding one of the one or more employees, wherein the one or more managed accounts are funded by a provider that temporarily provides the one or more employees with an advance on behalf of the company, and a bank server that has one or more bank accounts to which one or more salaries of the one or more employees are transferred from the company, wherein the servers are connected via a network, the computer program product comprising a non-transitory computer-usable medium having a computer-readable program code embodied therein, the computer-readable program code causing a computer to perform:

calculating an individual advanceable amount for an individual employee based on the credit limit amount data and the time data, and managing the electronic value information in an individual managed account based on the individual advanceable amount, transferring the electronic value information from the individual managed accounts to an individual bank account, and outputting to the company server an individual advance amount loaned or lent to the individual employee by transferring the electronic value information from the individual managed account to the individual bank account, wherein the individual advanceable amount is set such that a total advanceable amount to the one or more employees of a same company does not exceed a total advanceable amount range for the company set by the provider.

* * * * *